US012648002B2

(12) United States Patent
Takeda et al.

(10) Patent No.: US 12,648,002 B2
(45) Date of Patent: Jun. 2, 2026

(54) DOWNLINK CONTROL CHANNEL MONITORING CAPABILITY INDICATION

(71) Applicant: QUALCOMM Incorporated, San Diego, CA (US)

(72) Inventors: Kazuki Takeda, Minato-ku (JP); Peter Gaal, San Diego, CA (US); Jae Ho Ryu, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/463,987

(22) Filed: Sep. 8, 2023

(65) Prior Publication Data

US 2024/0121799 A1     Apr. 11, 2024

Related U.S. Application Data

(60) Provisional application No. 63/377,644, filed on Sep. 29, 2022.

(51) Int. Cl.
*H04W 72/232* (2023.01)
*H04W 72/0446* (2023.01)

(52) U.S. Cl.
CPC ..... *H04W 72/232* (2023.01); *H04W 72/0446* (2013.01)

(58) Field of Classification Search
CPC ............ H04W 72/232; H04W 72/0446; H04L 5/001; H04L 5/0053
(Continued)

(56) References Cited

U.S. PATENT DOCUMENTS

2022/0046683 A1* 2/2022 Takeda .............. H04L 27/26025
2023/0283445 A1* 9/2023 Saber ................... H04L 5/0091
(Continued)

FOREIGN PATENT DOCUMENTS

WO     WO-2021205384 A1 * 10/2021  ........... H04L 5/0094
WO     WO-2022029316 A1 * 2/2022  ........... H04L 5/0053

OTHER PUBLICATIONS

International Search Report and Written Opinion—PCT/US2023/073848—ISA/EPO—Nov. 29, 2023.
(Continued)

*Primary Examiner* — Chi Tang P Cheng
*Assistant Examiner* — Michael Wayne Maddox
(74) *Attorney, Agent, or Firm* — Harrity & Harrity, LLP

(57) ABSTRACT

Various aspects of the present disclosure generally relate to wireless communication. In some aspects, a user equipment (UE) may transmit information identifying a monitoring capability. The UE may monitor, in accordance with the monitoring capability, a configured set of control channel elements (CCEs) for physical downlink control channel (PDCCH) decoding for a scheduled cell of a set of scheduled cells, a scheduled cell, of the set of scheduled cells, being associated with a configured set of carrier indicator field values, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis. The UE may decode DCI in one or more CCEs of the monitored configured set of CCEs. Numerous other aspects are described.

30 Claims, 25 Drawing Sheets

1100 ——▶

1110 ∽ Transmit information identifying a monitoring capability

1120 ∽ Monitor, in accordance with the monitoring capability, a configured set of CCEs for PDCCH decoding for a scheduled cell of a set of scheduled cells 1130 ∽ Decode DCI in one or more CCEs of the monitored configured set of CCEs

(58) Field of Classification Search
USPC ........................................................ 370/329
See application file for complete search history.

(56) References Cited

U.S. PATENT DOCUMENTS

| | | | | |
|---|---|---|---|---|
| 2023/0354331 A1* | 11/2023 | MolavianJazi | ......... | H04L 5/001 |
| 2023/0413289 A1* | 12/2023 | Lei | ......... | H04L 5/0091 |
| 2024/0098729 A1* | 3/2024 | Shi | ......... | H04W 72/23 |
| 2025/0024458 A1* | 1/2025 | Liu | ......... | H04W 72/23 |
| 2025/0220683 A1* | 7/2025 | Liang | ......... | H04W 72/12 |
| 2025/0294574 A1* | 9/2025 | Choi | ......... | H04L 1/0038 |

OTHER PUBLICATIONS

Moderator (Lenovo): "Feature Lead Summary #1 on Multi-cell PUSCH/POSCH Scheduling with a Single DCI", 3GPP TSG RAN WG1 Meeting #109-e, R1-2205234, 3rd Generation Partnership Project, Mobile Competence Centre, 650, Route Des Lucioles, F-06921 Sophia-antipolis Cedex, France, vol. RAN WG1, No. e-Meeting, May 9, 2022-May 20, 2022, May 11, 2022, pp. 1-72, XP052146777, sections 3.4.1 and 3.6.

Qualcomm Incorporated: "Multi-cell PUSCH/PUSCH Scheduling with a Single DCI", 3GPP TSG RAN WG1 Meeting #109-e, R1-2205051, 3rd Generation Partnership Project, Mobile Competence Centre, 650, Route Des Lucioles, F-06921 Sophia-Antipolis Cedex, France, vol. RAN WG1, No. E-meeting, May 9, 2022-May 20, 2022, Apr. 29, 2022, 11 Pages, XP052191713, section 5.2.

Samsung: "Cross-carrier Scheduling from SCell to PCell", 3GPP TSG RAN WG1 #106bis-e, R1-2109518, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 10 Pages, XP052058463, p. 3-p. 8.

3GPP: "3rd Generation Partnership Project, Technical Specification Group Radio Access Network, NR, Physical layer procedures for control (Release 18)", 3GPP TS 38.213, V18.7.0, Jun. 2025, pp. 1-314.

NTT Docomo Inc: "New WID on Multi-Carrier Enhancements", 3GPP TSG RAN Meeting #94e, RP-213577, (revision of RP-213564), Electronic Meeting, Dec. 6, 2021-Dec. 17, 2021, Dec. 17, 2021, 5 Pages.

* cited by examiner

500 →

| | Step 505 | Step 510 | Step 515 | Step 520 |
|---|---|---|---|---|
| CSS DCI 0_0 | Size A | | | |
| CSS DCI 1_0 | Size A | | | |
| USS DCI 0_0 | | Size B | | |
| USS DCI 1_0 | | Size B | | |
| USS DCI 0_1 | | | Size C (+1 bit if aligned with size B) | |
| USS DCI 1_1 | | | Size D (+1 bit if aligned with size B) | |
| USS DCI 0_2 | | | | Size E |
| USS DCI 1_2 | | | | Size F |

FIG. 5A

| | Step 525 | Step 530 | Step 535 | Step 540 |
|---|---|---|---|---|
| CSS DCI 0_0 | Check if no more than 4 sizes and no more than 3 sizes with C-RNTI? | Size A | Size A | Size A |
| CSS DCI 1_0 | | Size A | Size A | Size A |
| USS DCI 0_0 | | Size B => Size A | Size A | Size A |
| USS DCI 1_0 | | Size B => Size A | Size A | Size A |
| USS DCI 0_1 | | Size C (remove the +1 bit) | Size C | Size C => Size C/D |
| USS DCI 1_1 | | Size D (remove the +1 bit) | Size D | Size D => Size C/D |
| USS DCI 0_2 | | Size E | Size E => Size E/F | Size E |
| USS DCI 1_2 | | Size F | Size F => Size E/F | Size F |

Third Scheduled Cell (CC2)

Second Scheduled Cell (CC1)

First Scheduled Cell (CC0)

$n_{cl}=0$

Up to M BDs
Up to C CCEs
OB allowed

Up to 8 DCI formats
(0_0/1_0/0_1/1_1/0_2/1_2/0_X/1_X)
Upt to 3_1 DCI sizes

610

| Value of $n_{CI}$ | Monitored DCIs | Scheduled cell(s) |
|---|---|---|
| 0 | 0_0/1_0/0_1/1_1/0_2/1_2 | CC0 |
| 1 | 0_1/1_1/0_2/1_2/0_X/1_X | CC1 or CC1, CC2 |

630

| Value of nCI | Monitored DCIs | Scheduled cell(s) |
|---|---|---|
| 0 | 0_0/1_0/0_1/1_1/0_2/1_2 | CC0 |
| 1 | 0_X/1_X | CC1, CC2 |

705

| Value of nCI | Monitored DCIs | Scheduled cell(s) |
|---|---|---|
| 0 | 0_0/1_0/0_1/1_1/0_2/1_2 | CC0 |
| 1 | 0_1/1_1/0_2/1_2/0_X/1_X | CC1 or CC0, CC1, CC2 |

715

| Value of nCI | Monitored DCIs | Scheduled cell(s) |
|---|---|---|
| 0 | 0_0/1_0/0_1/1_1/0_2/1_2 | CC0 |
| 1 | 0_1/1_1/0_2/1_2 | CC1 |
| 2 | 0_X/1_X | CC0, CC1, CC2 |

725

| Value of nCI | Monitored DCIs | Scheduled cell(s) |
|---|---|---|
| 0 | 0_0/1_0/0_1/1_1/0_2/1_2 | CC0 |
| 1 | 0_X/1_X | CC0, CC1, CC2 |
| 2 | 0_X/1_X | CC1, CC2 |

735

745

| Value of nCI | Monitored DCIs | Scheduled cell(s) |
|---|---|---|
| 0 | 0_0/1_0/0_1/1_1/0_2/1_2/0_X/1_X | CC0 or CC0, CC1, CC2 |
| 1 | 0_1/1_1/0_2/1_2/0_X/1_X | CC1 or CC1, CC2 |
| 2 | 0_0/1_1/0_2/1_2 | CC2 |

750

| Value of nCI | Monitored DCIs | Scheduled cell(s) |
|---|---|---|
| 0 | 0_0/1_0/0_1/1_1/0_2/1_2 | CC0 |
| 1 | 0_1/1_1/0_2/1_2 | CC1 |
| 2 | 0_1/1_1/0_2/1_2 | CC2 |
| 3 | 0_X/1_X | CC0, CC1, CC2 |
| 4 | 0_X/1_X | CC1, CC2 |

| Value of nCI | Monitored DCIs | Scheduled cell(s) |
|---|---|---|
| 0 | 0_0/1_0/0_1/1_1/0_2/1_2 | CC0 |
| 1 | 0_1/1_1/0_2/1_2 | CC1 |
| 2 | 0_X/1_X | CC0, CC1, CC2 |

825

Third Scheduled Cell (CC2)

Second Scheduled Cell (CC1)

First Scheduled Cell (CC0)

Up to 2 DCI formats (0_X/1_X)

Up to 4 DCI formats (0_1/1_1/0_2/1_2)

Up to 6 DCI formats (0_0/1_0/0_1/1_1/0_2/1_2)

nCI=2 nCI=1 nCI=0

820

| Value of nCI | Monitored DCIs | Scheduled cell(s) |
|---|---|---|
| 0 | 0_0/1_0/0_1/1_1/0_2/1_2 | CC0 |
| 1 | 0_X/1_X | CC0, CC1, CC2 |
| 2 | 0_X/1_X | CC1, CC2 |

835

845

| Value of nCI | Monitored DCIs | Scheduled cell(s) |
|---|---|---|
| 0 | 0_0/1_0/0_1/1_1/0_2/1_2/0_X/1_X | CC0 or CC0, CC1, CC2 |
| 1 | 0_1/1_1/0_2/1_2/0_X/1_X | CC1 or CC1, CC2 |
| 2 | 0_0/1_1/0_2/1_2 | CC2 |

850

| Value of nCI | Monitored DCIs | Scheduled cell(s) |
|---|---|---|
| 0 | 0_0/1_0/0_1/1_1/0_2/1_2 | CC0 |
| 1 | 0_1/1_1/0_2/1_2 | CC1 |
| 2 | 0_1/1_1/0_2/1_2 | CC2 |
| 3 | 0_X/1_X | CC0, CC1, CC2 |
| 4 | 0_X/1_X | CC1, CC2 |

| nCI | Scheduled CCs |
|-----|---------------|
| 0 | 0 |
| 1 | 1, 2 |
| 2 | 0, 1, 2 |
| 3 | 2, 3 |

900

| Scheduling CC | CIF/nCI value | Scheduled CC(s) | BD limit | Per-SCS BD limit with *pdcch-BlindDetectionCA* = 4 |
|---|---|---|---|---|
| #0 (15kHz) | - | #0 | 44 | 44 in total (44 x 4 x 2/8) |
| #1 (15kHz) | - | #1 | 44 | |
| #2 (30kHz) | 0 | #2 | 36 | 108 in total (36 x 4 x 6/8) |
| #2 (30kHz) | 1 | #3 | 36 | |
| #2 (30kHz) | 2 | #4 | 36 | |
| #2 (30kHz) | 3 | #5 | 36 | |
| #2 (30kHz) | 4 | #6 | 36 | |
| #2 (30kHz) | 5 | #3, #4, #5, #6 | 36 | |

Transmit information identifying a monitoring capability

1110

Monitor, in accordance with the monitoring capability, a configured set of CCEs for PDCCH decoding for a scheduled cell of a set of scheduled cells

1120

Decode DCI in one or more CCEs of the monitored configured set of CCEs

1130

1100

DOWNLINK CONTROL CHANNEL MONITORING CAPABILITY INDICATION

CROSS-REFERENCE TO RELATED APPLICATION

This Patent Application claims priority to U.S. Patent Application No. 63/377,644, filed on Sep. 29, 2022, entitled "DOWNLINK CONTROL CHANNEL MONITORING CAPABILITY INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink control channel monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include one or more memories and one or more processors coupled to the one or more memories. The one or more processors may be configured to transmit information identifying a monitoring capability. The one or more processors may be configured to monitor, in accordance with the monitoring capability, a configured set of control channel elements (CCEs) for physical downlink control channel (PDCCH) decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis. The one or more processors may be configured to decode DCI in one or more CCEs of the monitored configured set of CCEs.

Some aspects described herein relate to a method of wireless communication performed by a UE. The method may include transmitting information identifying a monitoring capability. The method may include monitoring, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The method may include decoding DCI in one or more CCEs of the monitored configured set of CCEs.

Some aspects described herein relate to a non-transitory computer-readable medium that stores a set of instructions for wireless communication by a UE. The set of instructions, when executed by one or more processors of the UE, may cause the UE to transmit information identifying a monitoring capability. The set of instructions, when executed by one or more processors of the UE, may cause the UE to monitor, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The set of instructions, when executed by one or more processors of the UE, may cause the UE to decode DCI in one or more CCEs of the monitored configured set of CCEs.

Some aspects described herein relate to an apparatus for wireless communication. The apparatus may include means for transmitting information identifying a monitoring capability. The apparatus may include means for monitoring, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The apparatus may include means for decoding DCI in one or more CCEs of the monitored configured set of CCEs.

Some aspects described herein relate to a UE for wireless communication. The user equipment may include one or more memories and one or more processors coupled to the one or more memories. The one or more processors may be configured to receive an indication to monitor PDCCH candidates for a DCI format. The one or more processors may be configured to monitor, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The one or more processors may be configured to decode DCI in one or more CCEs of the monitored configured set of CCEs.

Some aspects described herein relate to a method of wireless communication performed by a UE. The method may include receiving an indication to monitor PDCCH candidates for a DCI format. The method may include monitoring, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The method may include decoding DCI in one or more CCEs of the monitored configured set of CCEs.

Some aspects described herein relate to a non-transitory computer-readable medium that stores a set of instructions for wireless communication by a UE. The set of instructions, when executed by one or more processors of the UE, may cause the UE to receive an indication to monitor PDCCH candidates for a DCI format. The set of instructions, when executed by one or more processors of the UE, may cause the UE to monitor, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The set of instructions, when executed by one or more processors of the UE, may cause the UE to decode DCI in one or more CCEs of the monitored configured set of CCEs.

Some aspects described herein relate to an apparatus for wireless communication. The apparatus may include means for receiving an indication to monitor PDCCH candidates for a DCI format. The apparatus may include means for monitoring, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The apparatus may include means for decoding DCI in one or more CCEs of the monitored configured set of CCEs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating an example of DCI size alignment, in accordance with the present disclosure.

FIGS. 7A-7E are diagrams illustrating examples associated with downlink control channel monitoring, in accordance with the present disclosure.

FIGS. 8A-8E are diagrams illustrating examples associated with downlink control channel monitoring, in accordance with the present disclosure.

FIG. 10 is a diagram illustrating an example associated with downlink control channel monitoring, in accordance with the present disclosure.

DETAILED DESCRIPTION

Figure 1:
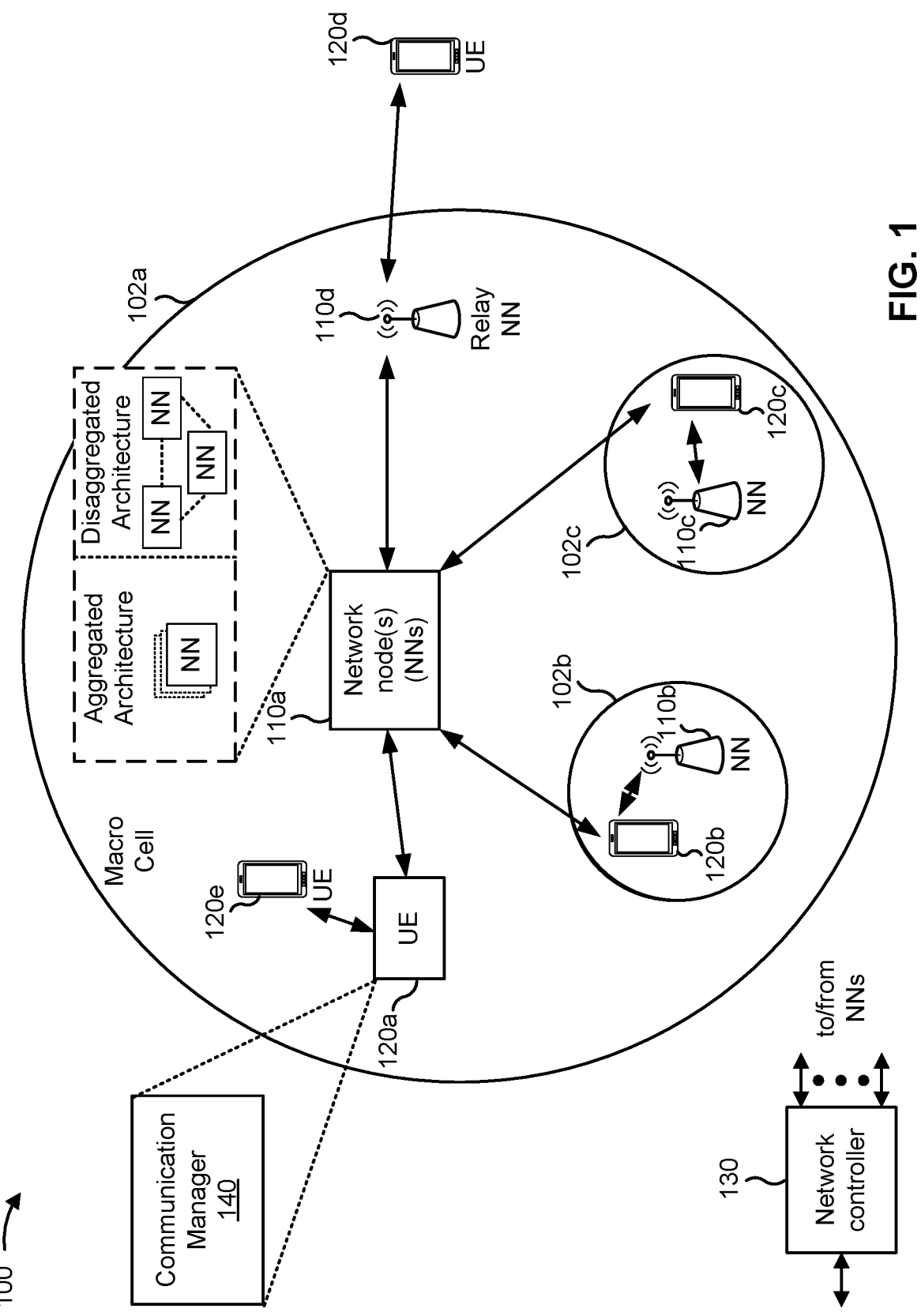
FIG. 1 is a diagram illustrating an example of a wireless network, in accordance with the present disclosure.

A user equipment (UE) may be configured to monitor a maximum quantity of downlink control information (DCI) sizes. For example, the UE may monitor 3 DCI sizes for a cell radio network temporary identifier (C-RNTI), a cell-specific radio network temporary identifier (CS-RNTI), and/or an MCS-C-RNTI and 1 additional DCI size for other radio network temporary identifiers (RNTI). This configuration may be referred to as a "3+1" DCI size budget.

A DCI may be associated with a carrier indicator field (CIF) value that may correspond to a carrier on which the DCI is scheduling. The cell on which the DCI is received may be referred to as a "scheduling cell," and the cell that the DCI is scheduling may be referred to as a "scheduled cell." Each CIF value may be associated with a different cell in a one-to-one mapping, such as a first CIF value mapping to a first cell, a second CIF value mapping to a second cell, and a third CIF value mapping to a third cell. Each cell and each CIF value may have a separate maximum configured quantity BDs, CCEs, and/or DCI sizes. Accordingly, each CIF value may be associated with a separate 3+1 DCI size budget. However, limiting CIF values to a one-to-one mapping may limit signaling flexibility. It has been proposed to allow CIF values to map on other bases. For example, a CIF value may map to a plurality of carriers, or a plurality of CIF values may map to the same carrier. In such scenarios, each CIF value may not be configurable with a separate 3+1 DCI size budget.

Some aspects described herein enable downlink control channel monitoring. For example, some aspects described herein provide configurations for DCI size budgets in cross-carrier scheduling scenarios that have non-one-to-one CIF mappings. As an example, a UE may be configured with a BD or CCE (monitoring) budget on a per scheduled cell basis and a 3+1 DCI size budget, may receive an indication to monitor, and may monitor a scheduled cell as described herein in more detail. As another example, the UE may be configured with a BD or CCE monitoring budget on a per CIF value basis. In some aspects, the 3+1 DCI size budget (or another DCI size budget) may be configured on a per scheduled cell or per CIF value basis. In some aspects, a UE may transmit information identifying a UE capability associated with a BD or CCE monitoring budget. For example, a UE may report a value for a pdcch-BlindDetectionCA parameter identifying a quantity of blind decodes per slot for all scheduling cells (e.g., with all CIF values) sharing a common SCS configuration. In this way, improved network flexibility is achieved by enabling the UE to monitor a scheduled cell in the aforementioned scenarios.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit information identifying a monitoring capability; monitor, in accordance with the monitoring capability, a configured set of control channel elements (CCEs) for physical downlink control channel (PDCCH) decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis; and decode DCI in one or more CCEs of the monitored configured set of CCEs. The communication manager 140 may receive an indication to monitor PDCCH candidates for a DCI format; monitor, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis; and decode DCI in one or more CCEs of the monitored configured set of CCEs. Additionally, or alternatively, the communication manager 140 may perform one or more other operations described herein.

As indicated above, FIG. 1 is provided as an example. Other examples may differ from what is described with regard to FIG. 1.

Figure 2:
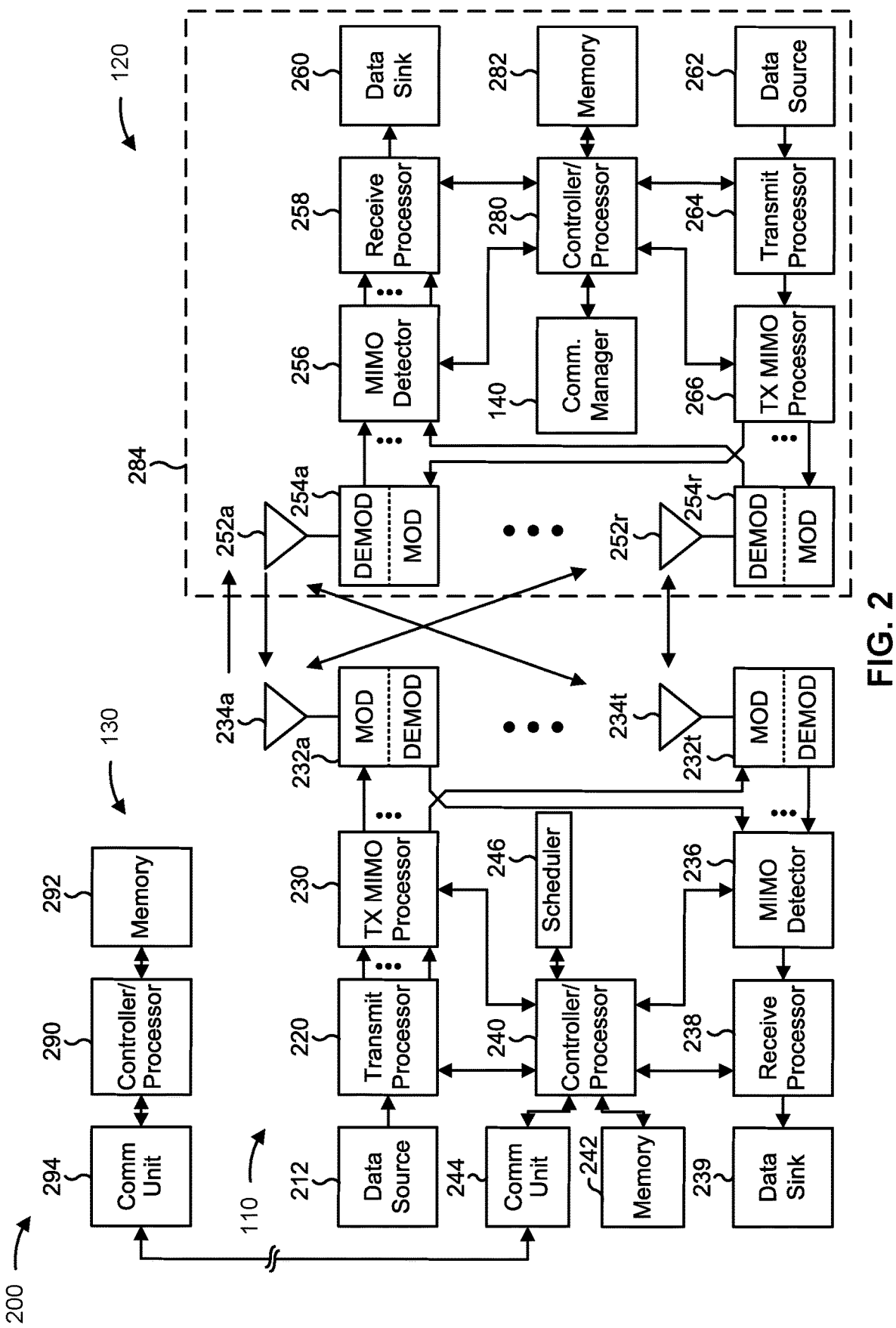
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-12).

The controller/processor 240 of the network node 110, the controller/processor 280 of the UE 120, and/or any other component(s) of FIG. 2 may perform one or more techniques associated with downlink control channel monitoring, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11 and/or other processes as described herein. In some examples, executing instructions may include running the instructions, converting the instructions, compiling the instructions, and/or interpreting the instructions, among other examples.

In some aspects, the UE 120 includes means for transmitting information identifying a monitoring capability; means for monitoring, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis; and/or means for decoding DCI in one or more CCEs of the monitored configured set of CCEs. The UE 120 may include means for receiving an indication to monitor PDCCH candidates for a DCI format; means for monitoring, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis; and means for decoding DCI in one or more CCEs of the monitored configured set of CCEs. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
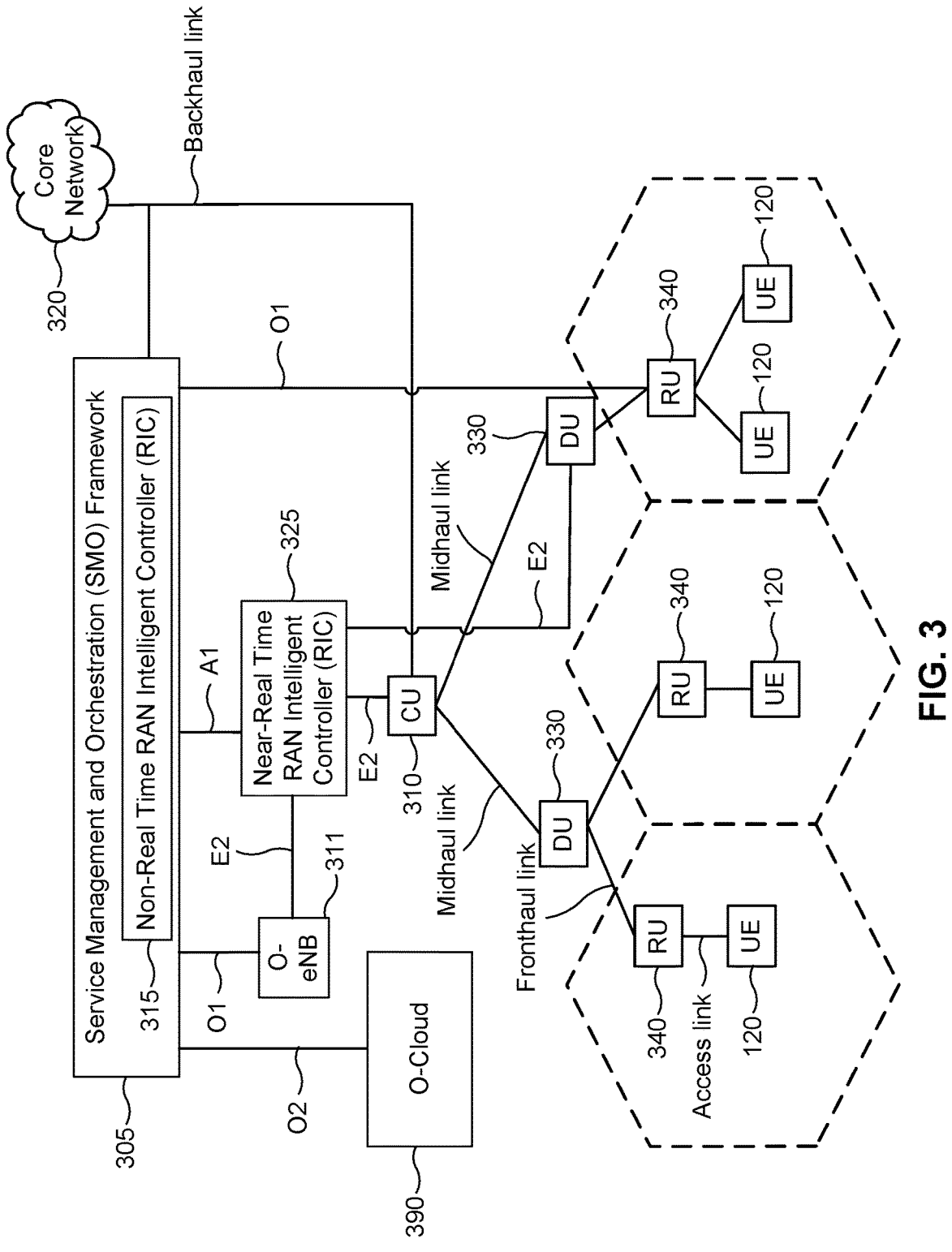
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
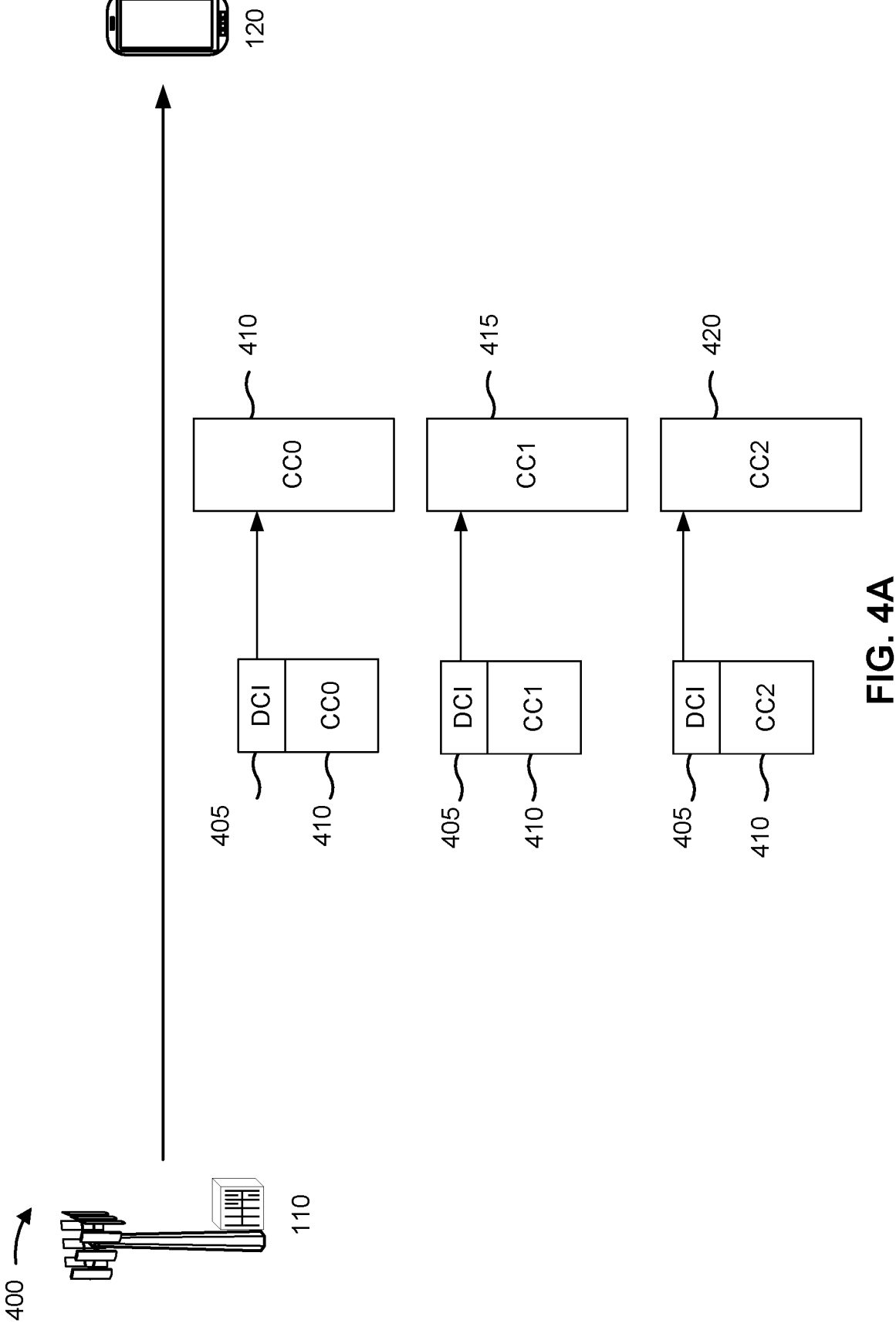
FIGS. 4A and 4B are diagrams illustrating examples of downlink control information (DCI) based scheduling, in accordance with the present disclosure.
Figure 4B:
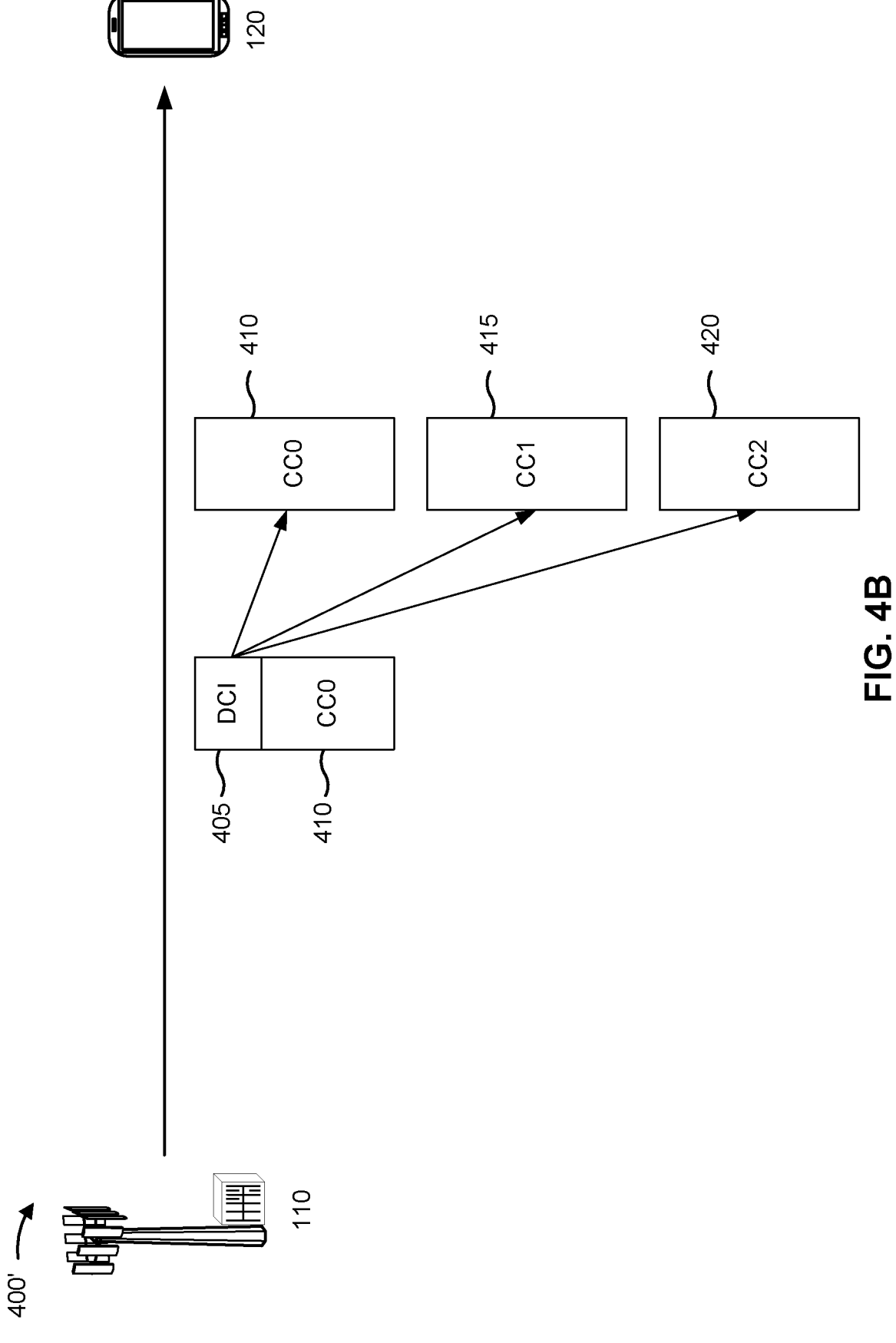

FIGS. 4A and 4B are diagrams illustrating examples 400/400' of DCI based scheduling, in accordance with the present disclosure. As shown in FIGS. 4A and 4B, a network node 110 and a UE 120 may communicate with one another (e.g., directly or via one or more network nodes).

As shown in FIG. 4A, as an example 400 of self-scheduling, the network node 110 may transmit a set of DCIs 405 that schedule communications for the UE 120. The communications may be scheduled on the same cells on which the set of DCIs 405 are conveyed. In some cases, a cell may be referred to as a component carrier (CC). For example, as shown, a first DCI 405 schedules a communication for a first cell 410 that carries the first DCI 405 (shown as CC0), a second DCI 405 schedules a communication for a second cell 415 that carries the second DCI 405 (shown as CC1), and a third DCI 405 schedules a communication for a third cell 420 carries the third DCI 405 (shown as CC2).

As shown in FIG. 4B, the network node 110 may transmit, to the UE 120 (e.g., directly or via one or more network nodes), a single DCI 405 that schedules multiple communications for the UE 120. The multiple communications may be scheduled for at least two different cells. In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 405 may be cross-carrier scheduling DCI, and may or may not be self-carrier scheduling DCI. In some cases, the DCI 405 that carries communications in at least two cells may be referred to as combination DCI.

In example 400', the single DCI 405 schedules a communication for a first cell 410 that carries the DCI 405 (shown as CC0), schedules a communication for a second cell 415 that does not carry the DCI 405 (shown as CC1), and schedules a communication for a third cell 420 that does not carry the DCI 405 (shown as CC2). In some cases, the DCI 405 may schedule communications on a different number of cells than shown in FIG. 4B (e.g., two cells, four cells, five cells, and so on). The number of cells may be greater than or equal to two.

A communication scheduled by DCI 405 may include a data communication, such as a physical downlink shared channel (PDSCH) communication or a physical uplink shared channel (PUSCH) communication. For a data communication, DCI 405 may schedule a single transport block (TB) across multiple cells or may separately schedule multiple TB s in the multiple cells. Additionally, or alternatively, a communication scheduled by DCI 405 may include a reference signal, such as a channel state information reference signal (CSI-RS) or a sounding reference signal (SRS). For a reference signal, DCI 405 may trigger a single resource for reference signal transmission across multiple cells or may separately schedule multiple resources for reference signal transmission in the multiple cells. In some cases, scheduling information in DCI 405 may be indicated once and reused for multiple communications (e.g., on different cells), such as an MCS, a resource to be used for acknowledgement (ACK) or negative acknowledgement (NACK) of a communication scheduled by DCI 405, and/or a resource allocation for a scheduled communication, to conserve signaling overhead.

In a self-scheduling use case, as shown in FIG. 4A, each DCI may have a configured maximum quantity M of blind decodes (BDs) and a configured maximum quantity C of CCEs. In some cases, M and C may be fixed values and/or the same value. In other cases, M and C may have changing values and/or be different values. For example, the values for M and C may be based at least in part on a quantity of carriers in a carrier aggregation configuration, a quantity of subcarrier spacings of carriers in a carrier aggregation configuration, or a UE capability for PDCCH processing, among other examples. Accordingly, when a value for one or more of the aforementioned factors changes, the values for M and/or C may change.

Each DCI can be configured with up to a maximum quantity N of DCI formats. For example, the first DCI 405 may have up to 4 DCI formats (e.g., selected from DCI formats 0_0, 1_0, 0_1, 1_1, or 0_2, 1_2, 0_3, 1_3, or other DCI formats) and up to 3+1 DCI sizes, as described in more detail with regard to FIGS. 5A and 5B. In contrast, the third DCI 405 may have PDCCH overbooking (OB) enabled and may have up to 6 DCI formats (e.g., selected from the aforementioned DCI formats) and up to 3+1 DCI sizes. In a cross-carrier scheduling case, the DCI 405 may be associated with a carrier indicator field (CIF) value $n_{CI}$. Each CIF value may correspond to a cell that the DCI 405 is scheduling. For example, the DCI 405 may have $n_{CI}=0$ corresponding to CC0, $n_{CI}=1$ corresponding to CC1, and $n_{CI}=2$ corresponding to CC2. In this case, each CIF value may be associated with the M BDs and C CCEs.

As indicated above, FIGS. 4A and 4B are provided as examples. Other examples may differ from what is described with respect to FIGS. 4A and 4B.

FIGS. 5A and 5B are diagrams illustrating an example 500 of DCI size alignment, in accordance with the present disclosure.

As shown in FIG. 5A, and by step 505, a UE may determine a first size, Size A, for a common search space (CSS) DCI 0_0 and for a CSS DCI 1_0 (if CSS DCI 0_0 or CSS DCI 1_0 are configured, respectively). In some cases, the UE may align the CSS DCI 0_0 to a size of the CSS DCI 1_0. For example, when the CSS DCI 0_0 has a larger size than the CSS DCI 1_0, the UE may add a set of zero padding bits to the CSS DCI 0_0 until the payload size is equal to that of the DCI 1_0. In contrast, if the CSS DCI 0_0 has a smaller size than the CSS DCI 1_0 prior to truncation, the UE may reduce the bitwidth of the frequency domain resource assignment (FDRA) field in the DCI 0_0 by truncating the first few most significant bits such that the size of DCI 0_0 equals to the size of the DCI 1_0.

As further shown in FIG. 5A, and by step 510, the UE may determine a second size, Size B, for a UE-specific search space (USS) DCI 0_0 and a USS DCI 1_0 (if USS DCI 0_0 or USS DCI 1_0 are configured, respectively). In some cases, the UE may align the USS DCI 0_0 and the USS DCI 1_0 to a common size by adding padding bits to a smaller one of the USS DCI 0_0 and the USS DCI 1_0.

As further shown in FIG. 5A, and by step 515, the UE may determine a third size, Size C, for a USS DCI 0_1 and a fourth size, Size D, for a USS DCI 1_1 (if USS DCI 0_1 or USS DCI 1_1 are configured, respectively). In some cases, the UE may determine Size C and/or Size D based at least in part on Size B. For example, the UE may set Size C and/or Size D as one bit greater than Size B.

As further shown in FIG. 5A, and by step 520, the UE may determine a fifth size, Size E, for a USS DCI 0_2 and a sixth size, Size F, for a USS DCI 1_2 (if USS DCI 0_2 or USS DCI 1_2 are configured, respectively).

As shown in FIG. 5B, and by step 525, the UE may determine whether a size threshold is satisfied. For example, based at least in part on which DCIs are configured for the UE, the UE may determine a quantity of DCI sizes. In other words, if CSS DCI 0_0 (Size A), CSS DCI 1_0 (Size A), USS DCI 0_1 (Size C), and USS DCI 0_2 (Size E) are configured, then there are three DCI sizes. In contrast, if CSS DCI 0_0 (Size A), USS DCI 0_0 (Size B), USS DCI 0_1 (Size C), and USS DCI 0_2 (Size E) are configured, then there are four DCI sizes. Based at least in part on determining the quantity of DCI sizes, the UE may determine whether there are more than 4 DCI sizes or more than 3 DCI sizes with a C-RNTI configured. If neither DCI size threshold is satisfied, then the UE may proceed without performing further steps of DCI size alignment. However, if either DCI size threshold is satisfied, then the UE may perform further steps of DCI size alignment, as described herein with regard to FIG. 5B and steps 530-540.

As further shown in FIG. 5B, and by step 530, the UE may perform a first set of size alignment actions. For example, the UE may maintain CSS DCI 0_0 and CSS DCI 1_0 (if configured) at Size A; the UE may align USS DCI 0_0 and/or USS DCI 1_0 (if configured) to Size A (e.g., using padding bits or truncating existing bits); the UE may remove the added bit in USS DCI 0_1 and USS DCI 1_1 (if configured) that was added with regard to step 515, and the UE may maintain a size of USS DCI 0_2 and USS DCI 1_2 (if configured).

As further shown in FIG. 5B, and by step 535, the UE may perform a second set of alignment actions. For example, the UE may maintain CSS DCI 0_0, CSS DCI 1_0, USS DCI 0_0, USS DCI 1_0, USS DCI 0_1, and USS DCI 1_1 (if configured); and may align USS DCI 0_2 with USS DCI 1_2 (if configured) by adding padding bits to one or the other to cause USS DCI 0_2 and USS DCI 1_2 to have a common size (e.g., Size E or Size F).

As further shown in FIG. 5B, and by step 540, the UE may perform a third set of alignment actions. For example, the UE may maintain CSS DCI 0_0, CSS DCI 1_0, USS DCI 0_0, USS DCI 1_0, USS DCI 0_2, and USS DCI 1_2 (if configured); and may align USS DCI 0_1 with USS DCI 1_1 (if configured) by adding padding bits to one or the other to cause USS DCI 0_1 and USS DCI 1_1 to have a common size (e.g., Size C or Size D). In some cases, the UE may repeat the check of step 525 after each of steps 530, 535, and 540. In other cases, the UE may perform multiple of steps 530, 535, and/or 540 before repeating the check of step 525. After performing the size alignment procedure, the UE ensures that the DCI size thresholds are satisfied, which enables the UE to successfully monitor for the configured DCIs.

As indicated above, FIGS. 5A and 5B are provided as examples. Other examples may differ from what is described with respect to FIGS. 5A and 5B.

As described above, a UE may be configured to monitor a maximum quantity of DCI sizes. For example, the UE may monitor 3 DCI sizes for a cell radio network temporary identifier (C-RNTI), a cell-specific radio network temporary identifier (CS-RNTI), and/or an MCS-C-RNTI and 1 additional DCI size for other radio network temporary identifiers (RNTI). Additional details of this "3+1" DCI size budget and DCI size alignment are described with regard to 3GPP Technical Specification (TS) 38.212, Section 7.3.1.0.

A DCI may be associated with a CIF value that may correspond to a carrier on which the DCI is scheduling. The cell on which the DCI is received may be referred to as a "scheduling cell," and the cell that the DCI is scheduling may be referred to as a "scheduled cell." Each CIF value may be associated with a different cell in a one-to-one mapping, such as a first CIF value mapping to a first cell, a second CIF value mapping to a second cell, and a third CIF value mapping to a third cell. Each cell and each CIF value may have a separate maximum configured quantity BDs, CCEs, and/or DCI sizes. Accordingly, each CIF value may be associated with a separate 3+1 DCI size budget. However, limiting CIF values to a one-to-one mapping may limit signaling flexibility. It has been proposed to allow CIF values to map on other bases. For example, a CIF value may map to a plurality of carriers, or a plurality of CIF values may map to the same carrier. In such scenarios, each CIF value may not be configurable with a separate 3+1 DCI size budget.

Some aspects described herein enable downlink control channel monitoring. For example, some aspects described herein provide configurations for DCI size budgets in cross-carrier scheduling scenarios that have non-one-to-one CIF mappings. As an example, a UE may be configured with a BD or CCE (monitoring) budget on a per scheduled cell basis and a 3+1 DCI size budget and may monitor a scheduled cell as described herein in more detail. As another example, the UE may be configured with a BD or CCE monitoring budget on a per CIF value basis. In some aspects, the 3+1 DCI size budget (or another DCI size budget) may be configured on a per scheduled cell or per CIF value basis. In some aspects, a UE may transmit information identifying a UE capability associated with a BD or CCE monitoring budget. For example, a UE may report a value for a pdcch-BlindDetectionCA parameter identifying a quantity of blind decodes per slot for all scheduling cells (e.g., with all CIF values) sharing a common SCS configuration. In this way, improved network flexibility is achieved by enabling the UE to monitor a scheduled cell in the aforementioned scenarios.

In some aspects, for search space set where multicell (MC) DCI (MC-DCI) is monitored, a UE is configured with an nCI value (e.g., a CIF value). This can be used to identify a set of CCEs for PDCCH blind decodes. If the UE monitors PDCCH candidates for MC-DCI for scheduling on serving cells from a set of serving cells, the serving cell for counting the size of MC-DCI, the PDCCH candidates, and a corresponding number of non-overlapped CCEs may include: the scheduling cell (if the scheduling cell is included in the set of cells and the UE is provided search space sets for PDCCH candidates only on the scheduling cell); or a serving cell from the set of cells (if search space sets with same searchSpaceId for MC-DCI is provided on the serving cell and on the scheduling cell). In other words, the value of nCI and the cell where DCI size, PDCCH candidates, and CCEs are counted may not need to be the same, in some aspects.

Figure 6A:
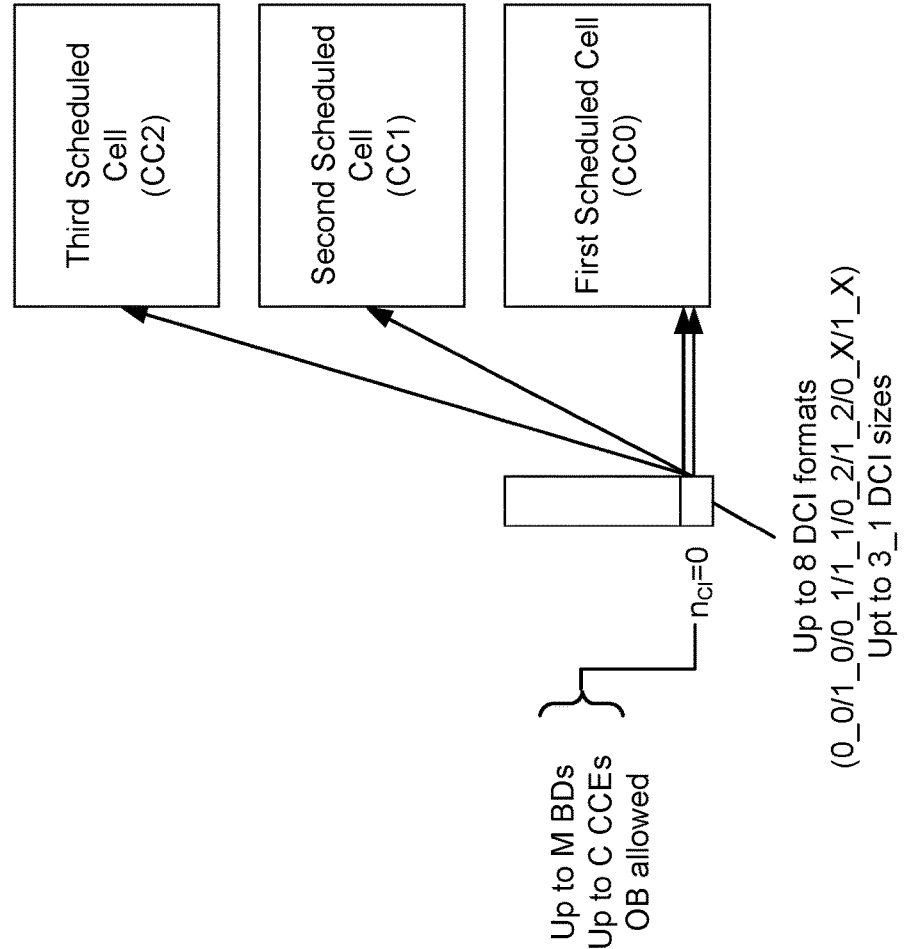
FIGS. 6A-6C are diagrams illustrating examples associated with downlink control channel monitoring, in accordance with the present disclosure.
Figure 6B:
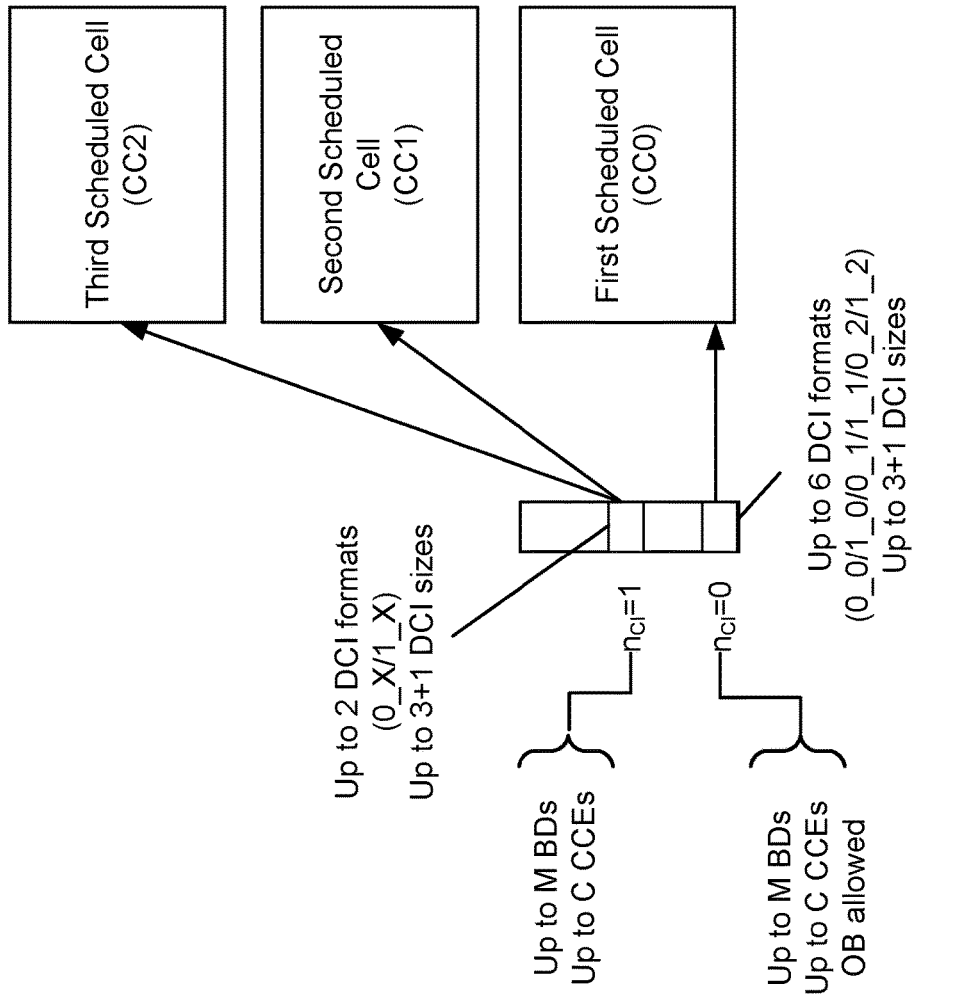
Figure 6C:
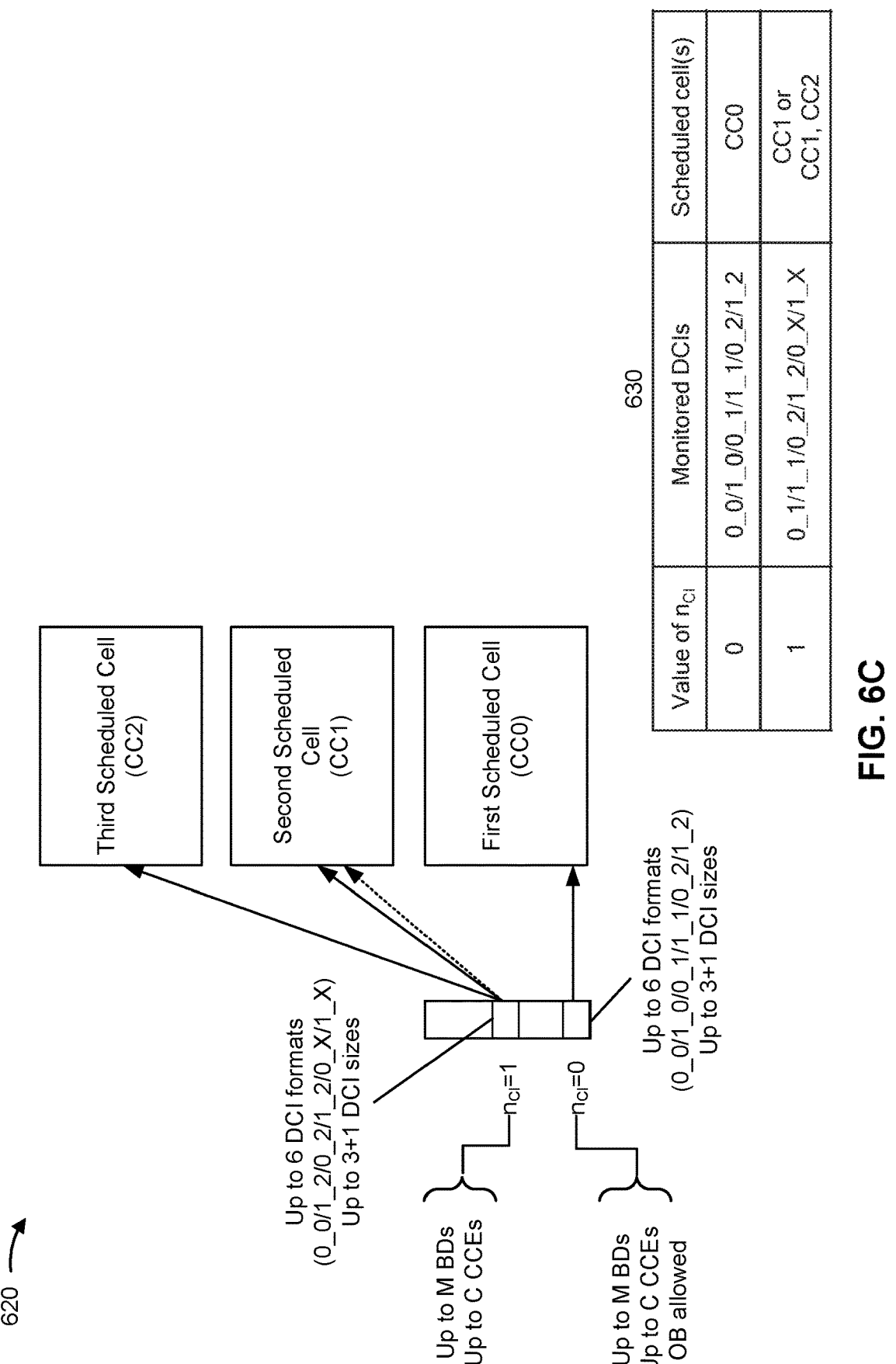

FIGS. 6A-6C are diagrams illustrating examples 600, 610, and 620 associated with downlink control channel monitoring, in accordance with the present disclosure.

In some aspects, a UE (e.g., the UE 120) may be configured with a BD or CCE budget and/or a DCI size budget. For example, the UE may be statically configured with a BD or CCE budget on a per scheduled cell basis (e.g., the BD or CCE budget is for each scheduled cell) and with a 3+1 DCI size budget on a per scheduled cell basis. Additionally, or alternatively, the UE may receive configuration information from a network node (e.g., the network node 110) configuring the UE with the BD or CCE budget and/or the DCI size budget.

As shown in FIG. 6A, and by example 600, each scheduled cell is associated with a single CIF value. For example, as shown, $n_{CI}=0$ maps to a first scheduled cell, a second scheduled cell, and a third scheduled cell. The CIF value may have up to M BDs, up to C CCEs, and may be configured for PDCCH OB. Additionally, or alternatively, the CIF value may be associated with up to 8 DCI formats (e.g., DCI formats 0_0/1_0/0_1/1_1/0_2/1_2/0_X/1_X, where X is a to be specified format value, such as 3 or 4) and 3+1 DCI sizes. In this case, the UE may monitor for a multi-carrier (MC) DCI (MC-DCI) as part of one or more search space (SS) sets or PDCCH candidates associated with the CIF value $n_{CI}=0$. In some aspects, the UE receives, from a network node, an RRC information element (IE) identifying a search space (SearchSpace) that includes a parameter (dci-FormatExt-r16), which is configured on a downlink bandwidth part of a scheduling cell for one or more USS sets that the UE is to monitor for MC-DCI. Additionally, or alternatively, the UE may receive, from a network node, a cross-carrier scheduling configuration IE (crossCarrierSchedulingConfig) identifying one or more search space sets that are to be used for cross-carrier scheduling for a particular CIF value.

As shown in FIG. 6B, and by example 610, each scheduled cell is associated with a single CIF value and a plurality of CIF values are provided to associate to the plurality of scheduled cells. For example, CIF value $n_{CI}=0$ maps to the first scheduled cell and $n_{CI}=1$ maps to the second and third scheduled cells. In this case, CIF value $n_{CI}=0$ is associated with up to M BDs and up to C CCEs and is configured for PDCCH OB, whereas $n_{CI}=1$ is associated with up to M BDs and up to C CCEs and is not configured for PDCCH OB. Although M and C are described in terms of being a single static value, M and C may have different values for, for example, different CIF values (e.g., based at least in part on a quantity of carriers or subcarrier spacings, a PDCCH processing capability, etc.). Collectively, the CIF values may be associated with up to 8 DCI formats, with $n_{CI}=0$ being associated with a first set of DCI formats (e.g., up to 6 DCI formats, such as 0_0/1_0/0_1/1_1/0_2/1_2) and $n_{CI}=1$ being associated with a second set of DCI formats (e.g., up to 2 DCI formats, such as 0_X/1_X, where X is a to be specified format value, such as 3 or 4). Accordingly, the UE may monitor MC-DCI (e.g., associated with $n_{CI}=1$) in a first one or more search space sets or PDCCH candidates and may monitor single-carrier (SC) DCI (SC-DCI) (e.g., associated with $n_{CI}=0$) in a second one or more search space sets or PDCCH candidates.

As shown in FIG. 6C, and by example 620, the set of DCI formats that are associated with each CIF value can be an overlapping set of DCI formats, in some examples. For example, $n_{CI}=0$ (which maps to the first scheduled cell CC0) may be associated with a first set of DCI formats (e.g., up to 6 DCI formats, such as 0_0/1_0/0_1/1_1/0_2/1_2) and $n_{CI}=1$ (which maps to either the second scheduled cell (CC1) only or to the second scheduled cell and the third scheduled cell (CC0)) may be associated with a second set of DCI formats (e.g., up to 6 DCI formats, such as 0_1/1_1/0_2/1_2/0_X/1_X), where at least one DCI format is in both the first set of DCI formats and the second set of DCI formats, as shown in diagram 630. In this case, the UE may monitor MC-DCI (e.g., for CIF value $n_{CI}=0$) in a portion of a search space set or a PDCCH candidate associated with a CIF value corresponding to the SC-DCI (e.g., $n_{CI}=1$).

In some aspects, the UE may perform DCI size alignment to ensure that the 3+1 DCI size budget is not exceeded. For example, the UE may perform a DCI size alignment procedure as described in more detail in FIGS. 5A and 5B. However, in this case, with the additional DCI formats 0_X/1_X, the UE may be configured such that DCI 0_X and 0_2 are not configured to be monitored together, and DCI 1_X and 1_2 are not configured to be monitored together. In this case, the Size E may be either USS DCI 0_2 or 0_X (rather than only DCI 0_2) and the size F may be USS DCI 1_2 or 1_X (rather than only DCI 1_2), as described with regard to FIGS. 5A and 5B. Accordingly, the UE may reuse the aforementioned DCI size alignment procedure with additional DCI formats by, for example, including restrictions that exclude some DCI formats from being monitored concurrent with other DCI formats.

As indicated above, FIGS. 6A-6C are provided as examples. Other examples may differ from what is described with respect to FIGS. 6A-6C.

FIGS. 7A-7E are diagrams illustrating examples 700, 710, 720, 730, and 740 associated with downlink control channel monitoring, in accordance with the present disclosure.

In some aspects, a UE (e.g., the UE 120) may be configured with a BD or CCE budget and/or a DCI size budget. For example, the UE may be statically configured with a BD or CCE budget on a per scheduled cell basis (e.g., the BD or CCE budget is for each scheduled cell) and with a 3+1 DCI size budget on a per scheduled cell basis. Additionally, or alternatively, the UE may receive configuration information from a network node (e.g., the network node 110) configuring the UE with the BD or CCE budget and/or the DCI size budget.

Figure 7A:
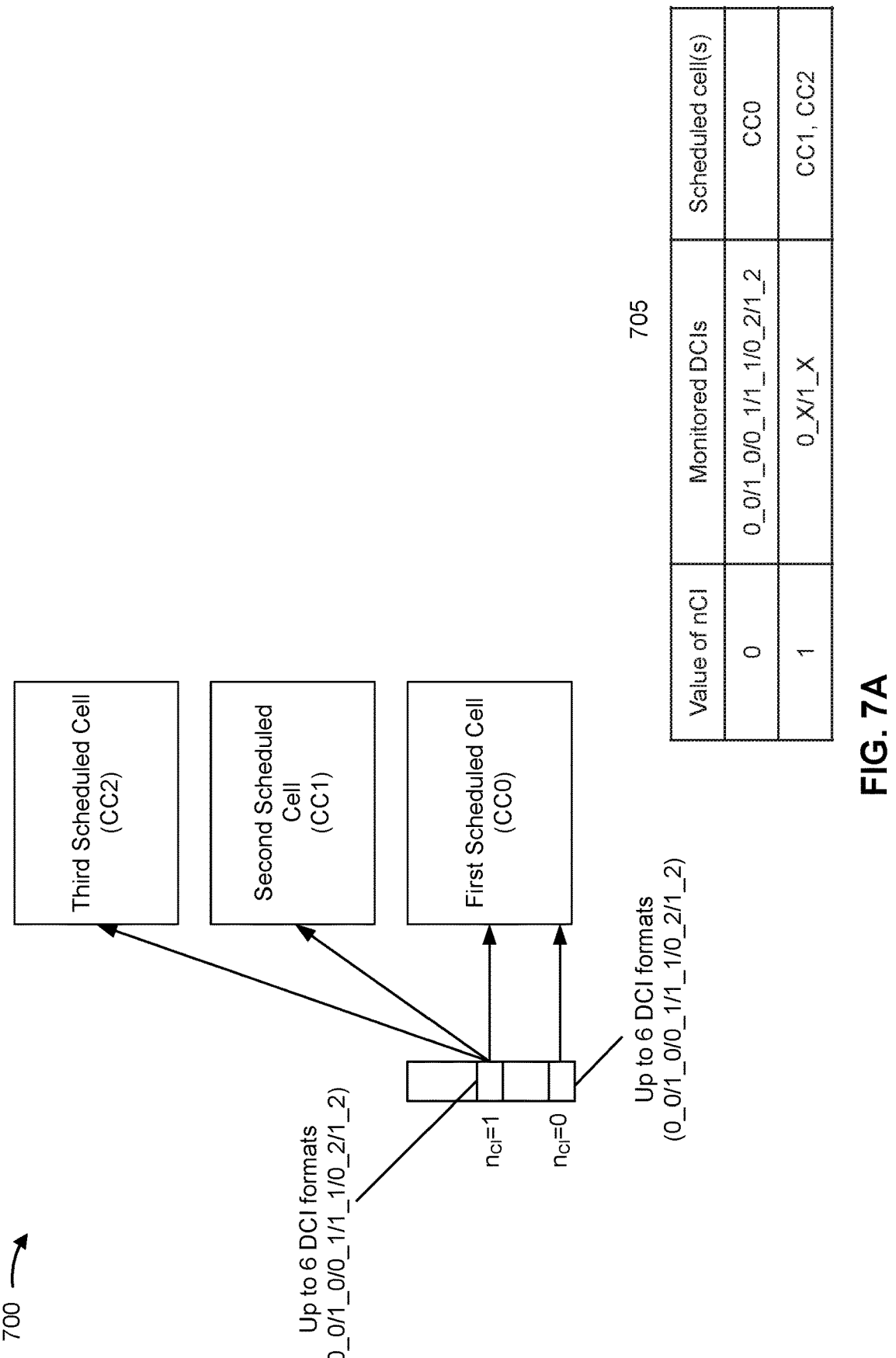

As shown in FIG. 7A, and by example 700, each scheduled cell may be associated with one or more CIF values. For example, as shown, $n_{CI}=0$ maps to a first scheduled cell and $n_{CI}=1$ maps to the first scheduled cell, a second scheduled cell, and a third scheduled cell. The first CIF value, $n_{CI}=0$, may be associated with up to 6 DCI formats (e.g., DCI formats 0_0/1_0/0_1/1_1/0_2/1_2), and the second CIF value, $n_{CI}=1$, may be associated with up to 2 DCI formats (e.g., DCI formats 0_X/1_X, where X is a to-be-specified format value, such as 3 or 4) and 3+1 DCI sizes, as shown in diagram 705. In this case, the UE may monitor for MC-DCI in one or more first search space sets or PDCCH candidates and may monitor for SC-DCI in one or more second search space sets or PDCCH candidates.

Figure 7B:
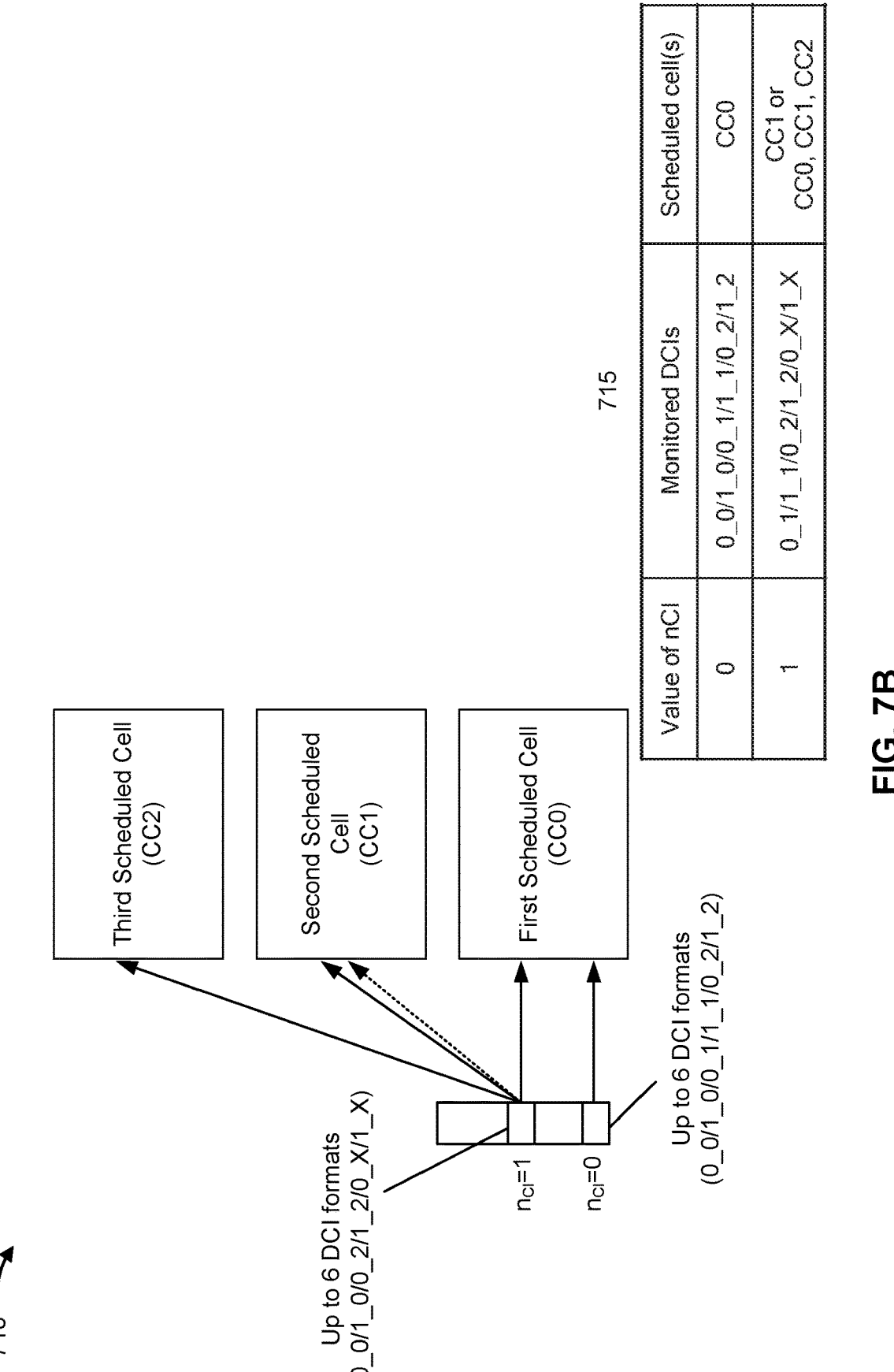

As shown in FIG. 7B, and by example 710 and diagram 715, the first CIF value and the second CIF value may map to overlapping sets of monitored DCI formats and scheduled cells. For example, the first CIF value, $n_{CI}=0$, may be associated with up to 6 DCI formats (e.g., DCI formats 0_0/1_0/0_1/1_1/0_2/1_2) and may map to the first scheduled cell and the second CIF value, $n_{CI}=1$, may be associated with up to 6 DCI formats (e.g., DCI formats 0_1/1_1/0_2/1_2/0_X/1_X) and may map to the second scheduled cell or to the first, second, and third scheduled cells.

Figure 7C:
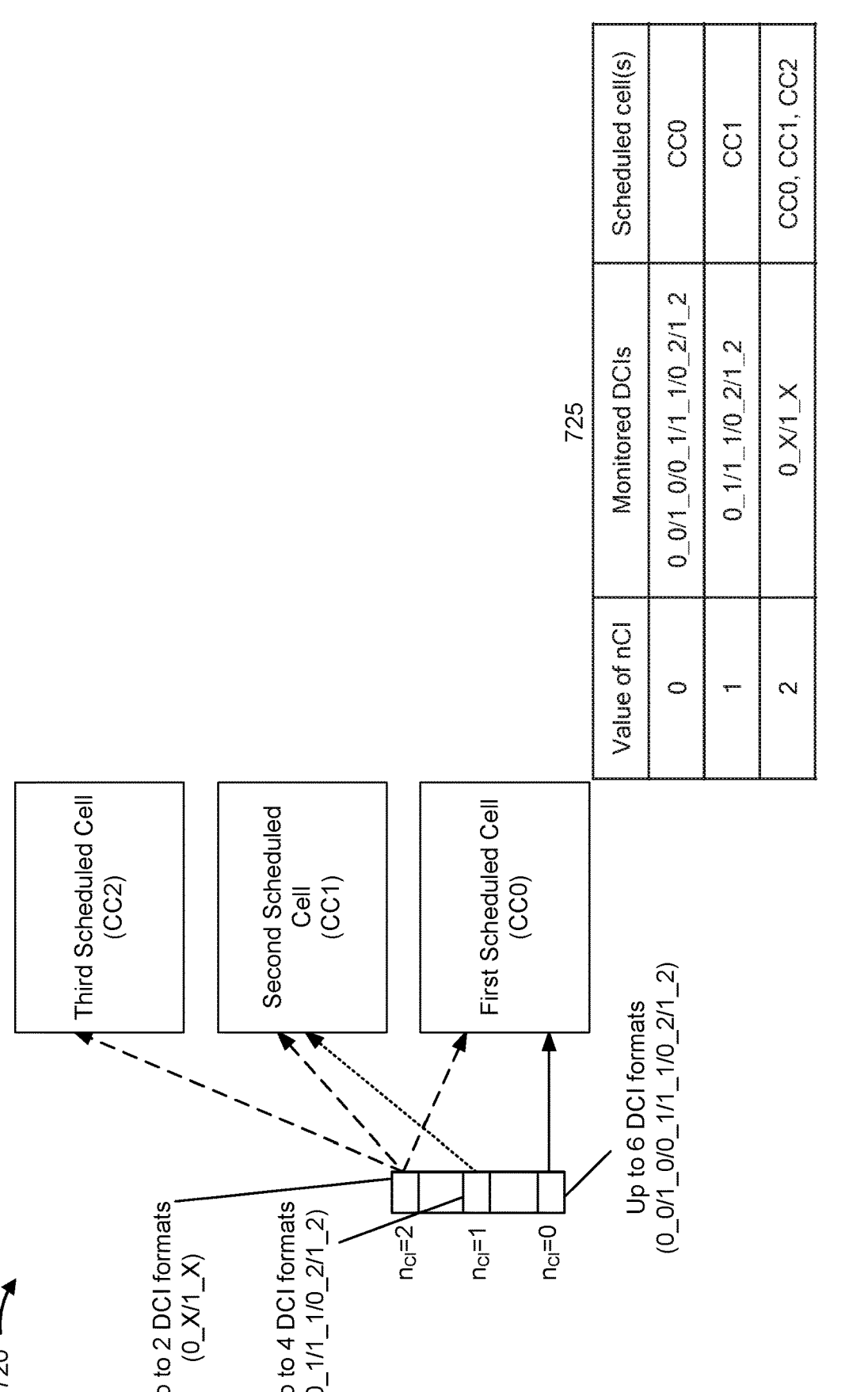

As shown in FIG. 7C, and by example 720 and diagram 725, the first CIF value and the second CIF value may map to the first scheduled cell and the second scheduled cell, respectively, and a third CIF value ($n_{CI}=2$) may map to the first, second, and third scheduled cells. In this case, the UE may monitor for SC-DCI in a first one or more search spaces or PDCCH candidates (e.g., a first search space for $n_{CI}=0$ and a second search space for $n_{CI}=1$) and for MC-DCI in a second one or more search spaces or PDCCH candidates (e.g., a third search space for $n_{CI}=2$). In some aspects, the UE may monitor different quantities of DCI formats for the different CIF values. For example, the UE may monitor up to 6 DCI formats for $n_{CI}=0$, up to 4 DCI formats for $n_{CI}=1$, and up to 2 DCI formats for $n_{CI}=2$. Accordingly, and based at least in part on the quantities of BDs, CCEs, and DCI sizes being on a per scheduled cell basis, as described above, the UE may monitor up to M BDs, C CCEs, and 3+1 DCI sizes for, for example, CC0, with DCI formats 0_0/1_0/0_1/1_1/0_2/1_2 being monitored for $n_{CI}=0$ and DCI formats 0_X/1_X being monitored for $n_{CI}=2$. Similarly, for CC1, the UE may monitor M BDs, C CCEs, and 3+1 DCI sizes with DCI formats 0_1/1_1/0_2/1_2 for $n_{CI}=1$ and 0_X/1_X for $n_{CI}=2$. Similarly, for CC2, the UE may monitor M BDs, C CCEs, and 3+1 DCI sizes with DCI formats 0_X/1_X for $n_{CI}=2$.

Figure 7D:
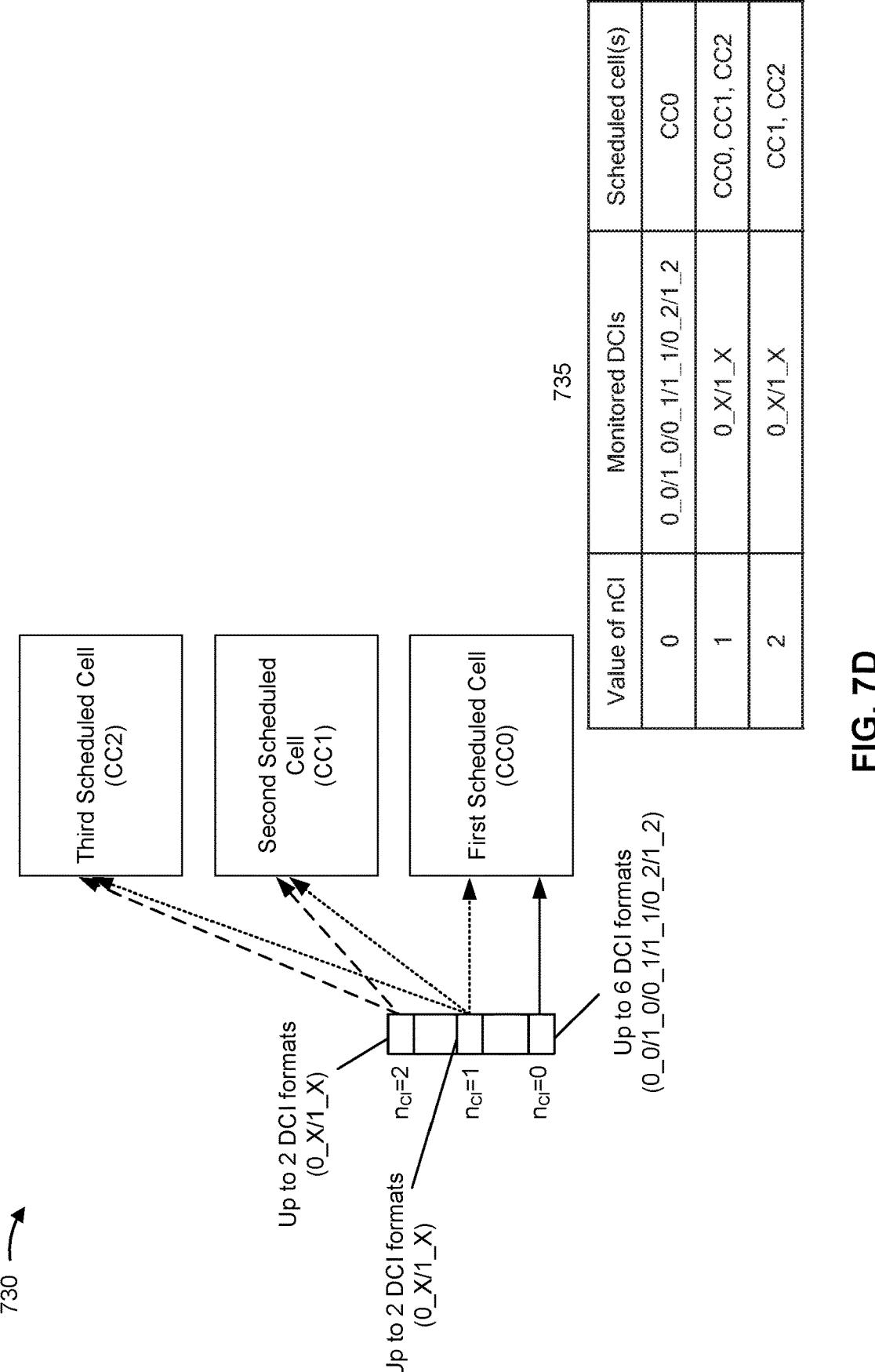

As shown in FIG. 7D, and by example 730 and diagram 735, the first CIF value may map to the first scheduled cell, the second CIF value may map to the first, second, and third scheduled cells, and the third CIF value may map to the second and third scheduled cells. In this case, the UE may monitor for SC-DCI in a first one or more search spaces or PDCCH candidates (e.g., a first search space for $n_{CI}=0$) and for MC-DCI in a second one or more search spaces or PDCCH candidates (e.g., a second search space for $n_{CI}=1$ and a third search space for $n_{CI}=2$). In some aspects, the UE may monitor different quantities of DCI formats for the different CIF values. For example, the UE may monitor up to 6 DCI formats for $n_{CI}=0$, up to 2 DCI formats for $n_{CI}=1$, and up to 2 DCI formats for $n_{CI}=2$. Accordingly, and based at least in part on the quantities of BDs, CCEs, and DCI sizes being on a per scheduled cell basis, as described above, the UE may monitor up to M BDs, C CCEs, and 3+1 DCI sizes for, for example, CC0, with DCI formats 0_0/1_0/0_1/1_1/0_2/1_2 being monitored for $n_{CI}=0$ and DCI formats 0_X/1_X being monitored for $n_{CI}=1$. Similarly, for CC1 and for CC2, the UE may monitor M BDs, C CCEs, and 3+1 DCI sizes with DCI formats 0_X/1_X for $n_{CI}=1$ and 0_X/1_X for $n_{CI}=2$.

As shown in FIG. 7E, and by example 740 and diagrams 745 and 750, the UE may monitor for DCI associated with other CIF value mappings and scheduled cells. For example, with regard to diagram 745, for CC0, the UE may monitor up to M BDs, C CCEs, and 3+1 DCI sizes for, for example, CC0, with DCI formats 0_0/1_0/0_1/1_1/0_2/1_2/0_X/1_X being monitored for $n_{CI}=0$. Similarly, for CC1, the UE may monitor M BDs, C CCEs, and 3+1 DCI sizes with DCI formats 0_1/1_1/0_2/1_2/0_X/1_X for $n_{CI}=1$ and 0_X/1_X for $n_{CI}=0$. Similarly, for CC2, the UE may monitor M BDs, C CCEs, and 3+1 DCI sizes with DCI formats 0_X/1_X for $n_{CI}=1$ and DCI formats 0_1/1_1/0_2/1_2 for $n_{CI}=2$.

In contrast, with regard to diagram 750, which includes additional CIF values $n_{CI}=3$ and $n_{CI}=4$, the UE may monitor DCI formats 0_0/1_0/0_1/1_1/0_2/1_2 on $n_{CI}=0$ 0_X/1_X on $n_{CI}=3$, and 0_X/1_X on $n_{CI}=4$. Similarly, the UE may monitor DCI formats 0_0/1_1/0_2/1_2 on $n_{CI}=1$, 0_X/1_X on $n_{CI}=3$, and 0_X/1_X on $n_{CI}=4$. Similarly, the UE may monitor DCI formats 0_0/1_1/0_2/1_2 on $n_{CI}=2$, 0_X/1_X on $n_{CI}=3$, and 0_X/1_X on $n_{CI}=4$. In these cases, the UE may monitor multiple MC-DCI search space sets or PDCCH candidates and/or multiple SC-DCI search space sets or PDCCH candidates. In some aspects, the UE may perform DCI size alignment by evaluating DCI sizes across all CIF values that can schedule the same cell. In some aspects, the UE may receive, from a network node and for each scheduled cell, RRC configuration information identifying a CIF value associated with a scheduled cell and/or one or more DCI formats or search space sets that the UE is to monitor for a CIF value. In this way, the UE is enabled to monitor DCI across a plurality of CIF values for a particular scheduled cell.

As indicated above, FIGS. 7A-7E are provided as examples. Other examples may differ from what is described with respect to FIGS. 7A-7E.

FIGS. 8A-8E are diagrams illustrating examples 800, 810, 820, 830, and 840 associated with downlink control channel monitoring, in accordance with the present disclosure.

In some aspects, a UE (e.g., the UE 120) may be configured with a BD or CCE budget and/or a DCI size budget. For example, the UE may be statically configured with a BD or CCE budget on a per CIF value basis (e.g., the BD or CCE budget is for each CIF value, rather than each scheduled cell, as described above) and with a 3+1 DCI size budget on a per CIF value basis. In other words, for CIF value $n_{CI}$=0, the UE may monitor up to 3+1 DCI sizes, for CIF value $n_{CI}$=1, the UE may monitor up to 3+1 DCI sizes, etc. Accordingly, when performing DCI size alignment, as described above, the UE may align DCI sizes to satisfy the maximum quantity of DCI sizes for each CIF value, rather than for each scheduled cell, as described above. In some aspects, each scheduled cell is associated with a single CIF value. In this case, DCI size alignment may occur using the same or a similar procedure to when the DCI size budget (or BD or CCE budget) is on a per scheduled cell basis (as there is one CIF value for each scheduled cell), as described above. Additionally, or alternatively, a scheduled cell may be associated with a plurality of CIF values. In this case, DCI size alignment may occur as described herein. In some aspects, the UE may receive configuration information from a network node (e.g., the network node 110) configuring the UE with the BD or CCE budget and/or the DCI size budget.

Figure 8A:
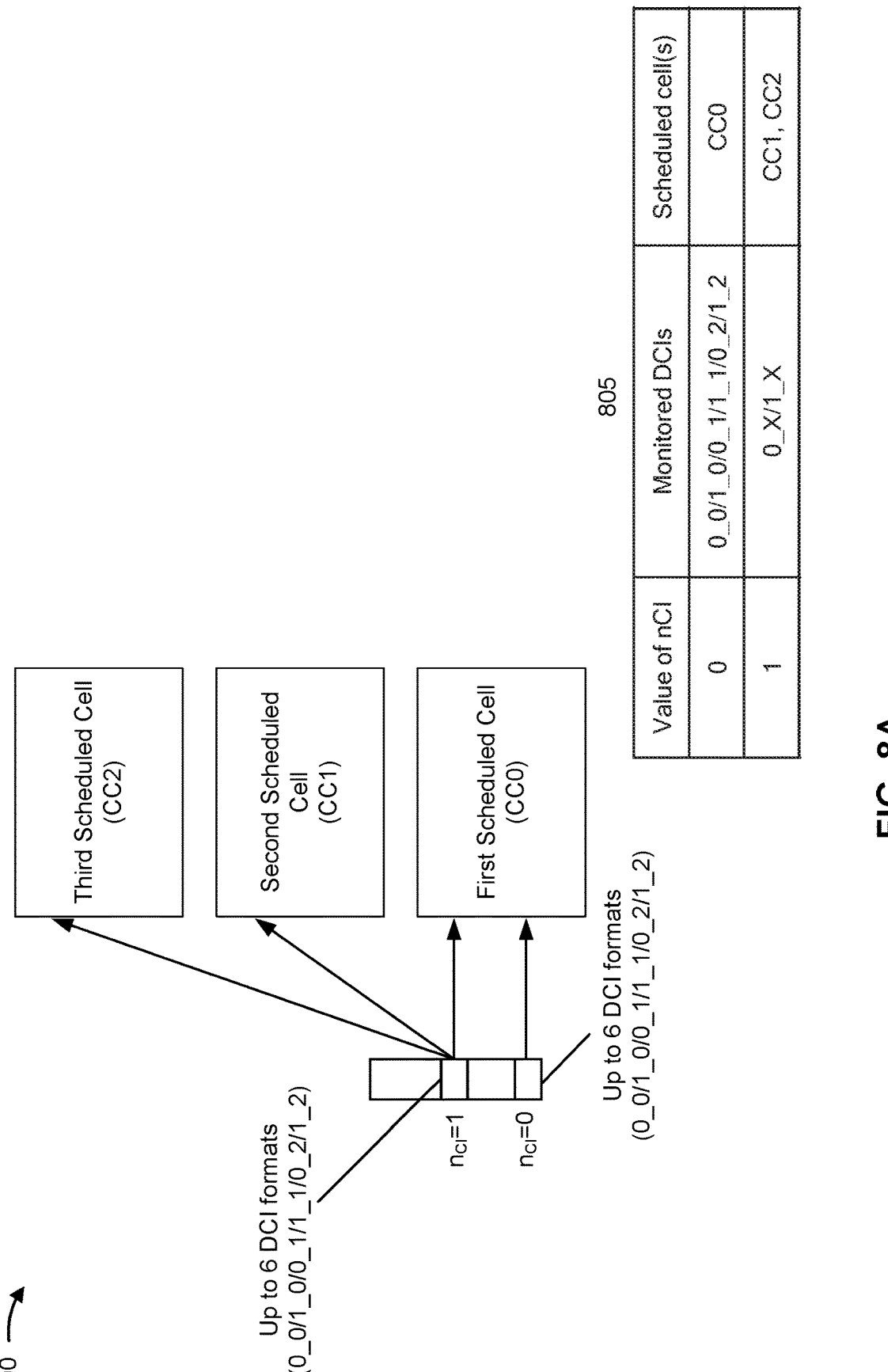

As shown in FIG. 8A, and by example 800, a scheduled cell may be associated with a plurality of CIF values. For example, as shown, $n_{CI}$=0 maps to a first scheduled cell and $n_{CI}$=1 maps to the first scheduled cell, a second scheduled cell, and a third scheduled cell. In other words, the first scheduled cell is associated with both $n_{CI}$=0 and $n_{CI}$=1. The first CIF value, $n_{CI}$=0, may be associated with up to 6 DCI formats (e.g., DCI formats 0_0/1_0/0_1/1_1/0_2/1_2) and the second CIF value, $n_{CI}$=1, may be associated with up to 2 DCI formats (e.g., DCI formats 0_X/1 X, where X is a to be specified format value, such as 3 or 4) and 3+1 DCI sizes, as shown in diagram 805. In this case, the UE may monitor for MC-DCI in one or more first search space sets or PDCCH candidates and may monitor for SC-DCI in one or more second search space sets or PDCCH candidates.

Figure 8B:
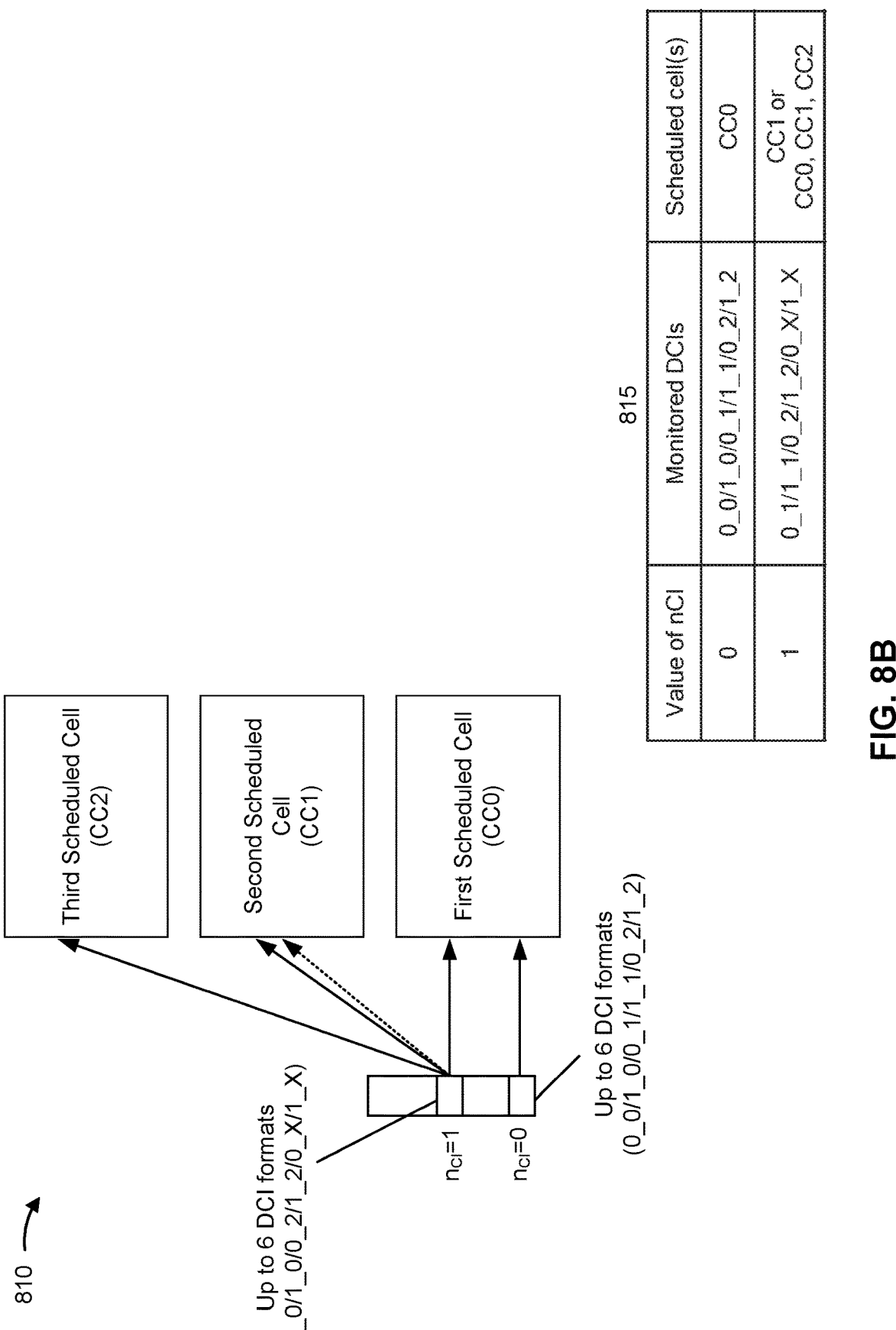

As shown in FIG. 8B, and by example 810 and diagram 815, a CIF value may have multiple scheduled cell mappings. For example, the second CIF value may map to the second scheduled cell or to the first, second, and third scheduled cell. The first CIF value, $n_{CI}$=0, may be associated with up to 6 DCI formats (e.g., DCI formats 0_0/1_0/0_1/1_1/0_2/1_2) and the second CIF value, $n_{CI}$=1, may be associated with up to 6 DCI formats (e.g., DCI formats 0_1/1_1/0_2/1_2/0_X/1_X).

Figure 8C:
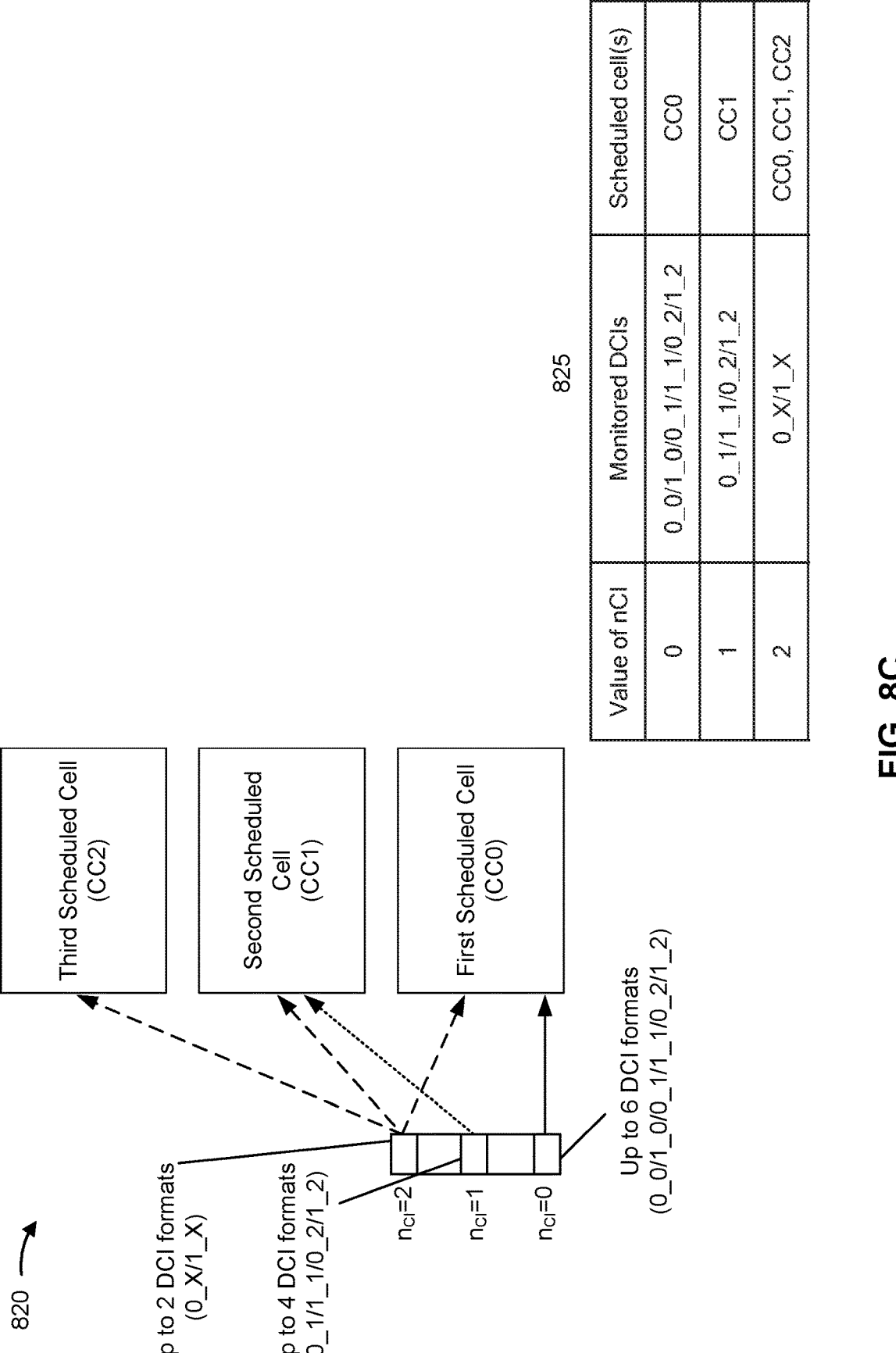

As shown in FIG. 8C, and by example 820 and diagram 825, the first CIF value may map to the first scheduled cell, the second CIF value may map to the second scheduled cell, and the third CIF value ($n_{CI}$=2) may map to the first, second, and third scheduled cells. In this case, the UE may monitor for SC-DCI in a first one or more search spaces or PDCCH candidates and for MC-DCI in a second one or more search spaces or PDCCH candidates. In some aspects, the UE may monitor different quantities of DCI formats for the different CIF values. For example, the UE may monitor up to 6 DCI formats for $n_{CI}$=0, up to 4 DCI formats for $n_{CI}$=1, and up to 2 DCI formats for $n_{CI}$=2. Accordingly, and based at least in part on the quantities of BDs, CCEs, and DCI sizes being on a per CIF value basis, as described above, the UE may monitor up to M BDs, C CCEs, and 3+1 DCI sizes for, for example, $n_{CI}$=0, with DCI formats 0_0/1_0/0_1/1_1/0_2/1_2 being monitored for CC0. Similarly, for $n_{CI}$=1, the UE may monitor M BDs, C CCEs, and 3+1 DCI sizes with DCI formats 0_1/1_1/0_2/1_2 for CC1. Similarly, for $n_{CI}$=2, the UE may monitor M BDs, C CCEs, and 3+1 DCI sizes with DCI formats 0_X/1_X for CC0, CC1, and CC2.

Figure 8D:
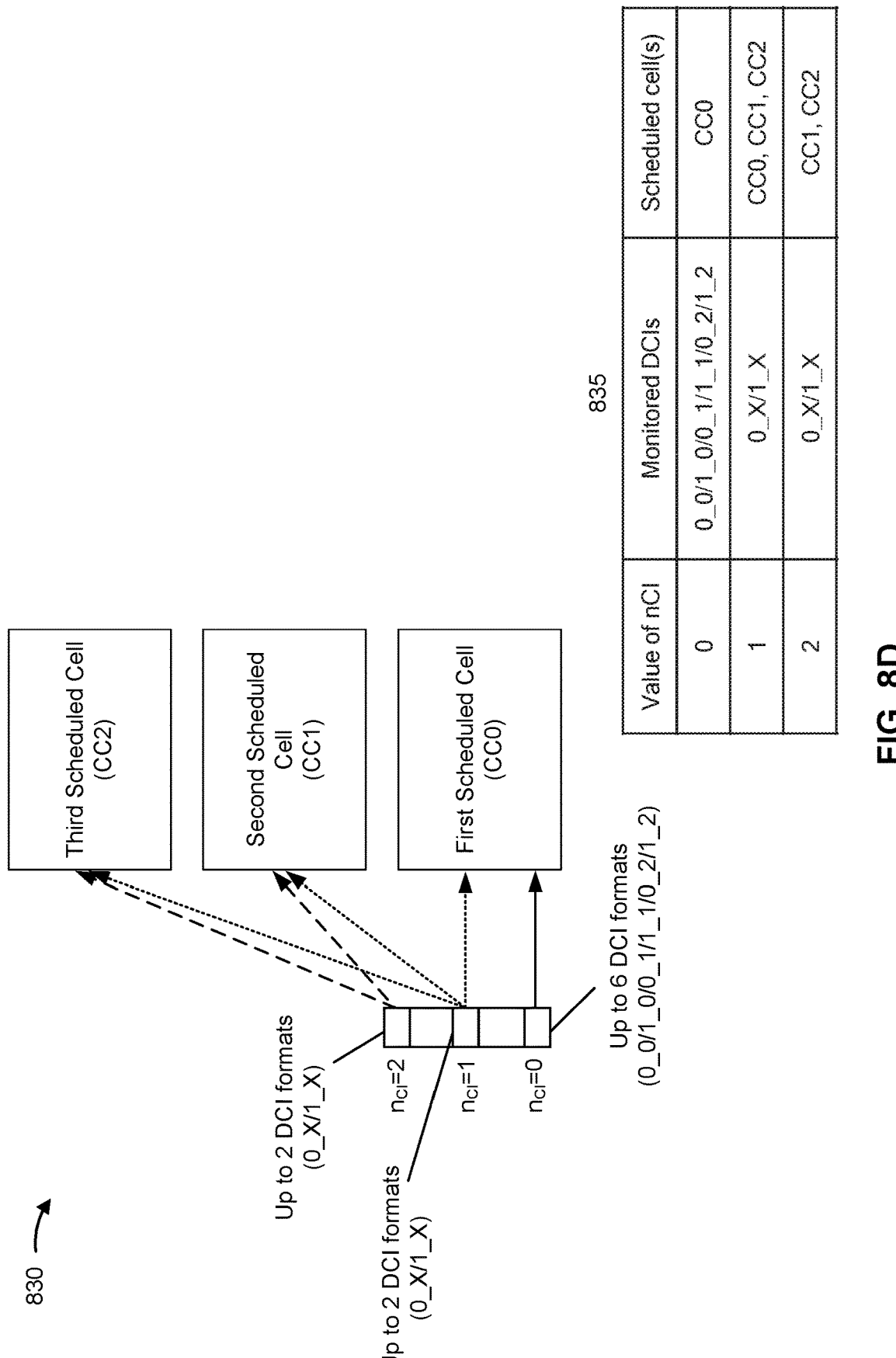

As shown in FIG. 8D, and by example 830 and diagram 835, the first CIF value may map to the first scheduled cell, the second CIF value may map to the first, second, and third scheduled cells, and the third CIF value may map to the second and third scheduled cells. In this case, the UE may monitor for SC-DCI in a first one or more search spaces or PDCCH candidates (e.g., a first search space for $n_{CI}$=0) and for MC-DCI in a second one or more search spaces or PDCCH candidates (e.g., a second search space for $n_{CI}$=1 and a third search space for $n_{CI}$=2). In some aspects, the UE may monitor different quantities of DCI formats for the different CIF values. For example, the UE may monitor up to 6 DCI formats for $n_{CI}$=0, up to 2 DCI formats for $n_{CI}$=1, and up to 2 DCI formats for $n_{CI}$=2. Accordingly, and based at least in part on the quantities of BDs, CCEs, and DCI sizes being on a per scheduled cell basis, as described above, the UE may monitor up to M BDs, C CCEs, and 3+1 DCI sizes for, for example, $n_{CI}$=0, with DCI formats 0_0/1_0/0_1/1_1/ 0_2/1_2 being monitored for CC0. Similarly, for $n_{CI}$=1 and $n_{CI}$=2, the UE may monitor M BDs, C CCEs, and 3+1 DCI sizes with DCI formats 0_X/1_X for CC0, CC1, and CC2 and for CC1 and CC2, respectively.

As shown in FIG. 8E, and by example 840 and diagrams 845 and 850, the UE may monitor for DCI associated with other CIF value mappings and scheduled cells. For example, with regard to diagram 845, for $n_{CI}$=0, the UE may monitor up to M BDs, C CCEs, and 3+1 DCI sizes with DCI formats 0_0/1_0/0_1/1_1/0_2/1_2/0_X/1_X being monitored for CC0 or CC0, CC1, and CC2. Similarly, for $n_{CI}$=1, the UE may monitor M BDs, C CCEs, and 3+1 DCI sizes with DCI formats 0_1/1_1/0_2/1_2/0_X/1_X for CC1 or CC1 and CC2. Similarly, for $n_{CI}$=2, the UE may monitor M BDs, C CCEs, and 3+1 DCI sizes with DCI formats 0_X/1_X for CC2.

In contrast, with regard to diagram 850, which includes additional CIF values $n_{CI}$=3 and $n_{CI}$=4, the UE may monitor DCI formats 0_0/1_0/0_1/1_1/0_2/1_2 for CC0 (with $n_{CI}$=0). Similarly, the UE may monitor DCI formats 0_0/ 1_1/0_2/1_2 for CC1 (with $n_{CI}$=1). Similarly, the UE may monitor DCI formats 0_0/1_1/0_2/1_2 for CC2 (with $n_{CI}$=2). Similarly, the UE may monitor DCI formats 0_X/ 1_X for CC0, CC1, and CC2 (with $n_{CI}$=3) or for CC1 and CC2 (with $n_{CI}$=4). In these cases, the UE may monitor multiple MC-DCI search space sets or PDCCH candidates and/or multiple SC-DCI search space sets or PDCCH candidates.

In some aspects, PDCCH OB may be supported for some CIF values. For example, the UE may support PDCCH OB for USSs with $n_{CI}$=0. In this case, if a quantity of BDs or a quantity of non-overlapped CCEs per span or slot exceeds a capacity of the UE, the UE may determine not to monitor some of the search space sets that are configured to be monitored in the span or slot. In other words, the network node may configure the UE to monitor more BDs than the UE is capable of monitoring, and the UE may down select to a lower quantity of BDs to monitor. In some aspects, the UE may transmit capability signaling indicating a quantity of BDs, CCEs, and/or DCI sizes that the UE can monitor for each CIF value that is configured.

As indicated above, FIGS. 8A-8E are provided as examples. Other examples may differ from what is described with respect to FIGS. 8A-8E.

Figure 9A:
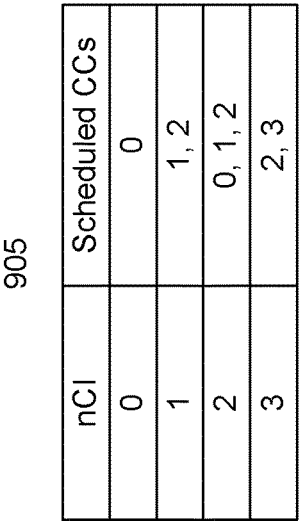
FIGS. 9A-9B are diagrams illustrating examples associated with downlink control channel monitoring, in accordance with the present disclosure.
Figure 9A:
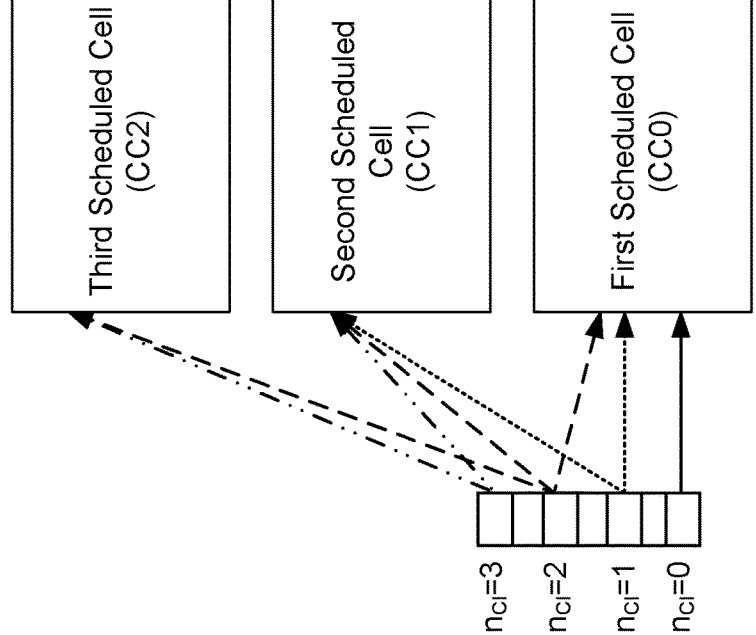
Figure 9B:
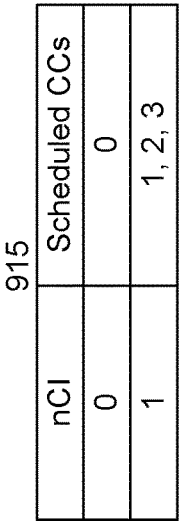
Figure 9B:
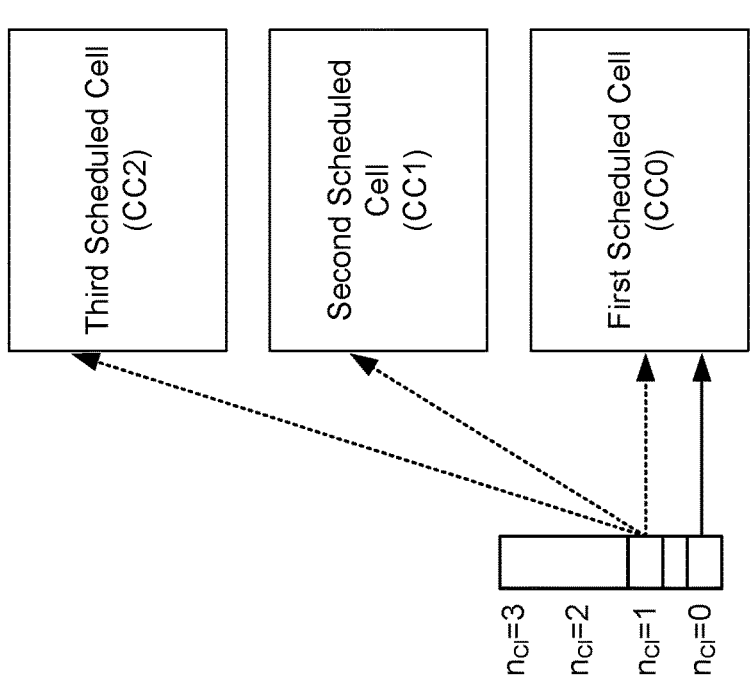

FIGS. 9A-9B are diagrams illustrating examples 900 and 910 associated with downlink control channel monitoring, in accordance with the present disclosure.

As shown in FIG. 9A, and by example 900 and diagram 905, the UE may be configured with a set of 4 CIF values ($n_{CI}$=0 to 3) corresponding to a set of three scheduled cells (CC0, CC1, and CC2). The first CIF value $n_{CI}$=0 maps to the first scheduled cell; the second CIF value $n_{CI}$=1 maps to the first scheduled cell and the second scheduled cell; the third CIF value $n_{CI}$=2 maps to the first scheduled cell, the second scheduled cell, and the third scheduled cell; and the fourth CIF value $n_{CI}$=3 maps to the second scheduled cell and the third scheduled cell.

As shown, when the quantity of BDs, CCEs, and DCI sizes that are to be monitored by the UE are on a per CIF value basis and the quantity of CIF values increases, the quantity of BDs, CCEs, and DCI sizes that are to be monitored increases accordingly. The UE may transmit a capability indicator (numMaxCCsPDCCH-monitoring) to a network node to indicate a maximum quantity of CIF values that the UE can be configured to monitor for a set of scheduled cells. The maximum quantity of scheduled cells may be indicated on a per carrier aggregation (CA) band combination basis (e.g., a maximum quantity for each set of CA bands) a per band per CA band combination basis (e.g., a maximum quantity for each band within a set of CA bands), or a per component carrier per CA band combination basis (e.g., a maximum quantity for each component carrier within a band of a set of CA bands).

In some aspects, the UE may transmit a capability indicator for a maximum quantity of CIF values that the UE can be configured with for a scheduled cell (e.g., a maximum quantity of CIF values per component carrier) (num-MaxNCIPerCCs). In this case, the capability indicator may indicate the maximum quantity of CIF values on a per CA band combination basis, a per band per CA band combination basis, or a per component carrier per CA combination basis. When the UE indicates a value of 3 or higher, the network node can configure the UE as shown in FIG. 9A. For example, in FIG. 9A, CC1 is associated with 3 CIF values ($n_{CI}$=1, 2, and 3). In this case, a network node may configure an association or mapping between CIF values and sets of scheduled cells based at least in part on the maximum quantity of CIF values per CC that the UE has indicated.

In some aspects, the UE may use the capability indicator to indicate a maximum quantity of CIF or $n_{CI}$ values with which the UE can be configured and/or a maximum quantity of scheduled cells for a scheduling cell. For example, when the UE indicates a maximum quantity of 4 CIF values, the network node may configure the UE as shown in FIG. 9A. Alternatively, the network node may configure the UE with fewer CIF values, as shown in FIG. 9B and by example 910 and diagram 915. In this case, the UE can support MC-DCI with reduced processing complexity relative to example 900. In some aspects, the maximum quantity of CIF values may be greater than or equal to a quantity of component carriers configured for CA. For example, a network node may configure monitoring for SC-DCIs and/or MC-DCIs such that the quantity of monitored SC-DCIs and/or MC-DCIs does not exceed the indicated UE capability. In some aspects, the configured SC-DCIs, when configured with different CIF values, are configured for different scheduled cells. Similarly, the configured MC-DCIs, when configured with different CIF values, may be configured for different sets of scheduled cells.

As indicated above, FIGS. 9A-9B are provided as examples. Other examples may differ from what is described with respect to FIGS. 9A-9B.

FIG. 10 is a diagram illustrating an example 1000 associated with downlink control channel monitoring, in accordance with the present disclosure.

A UE, such as the UE 120, may report a UE capability associated with identifying a BD or CCE monitoring budget on a per SCS basis. For example, the UE may transmit a report identifying value of a pdcch-BlindDetectionCA parameter. The value may indicate a quantity of BDs per slot, for all scheduling cells (and with all CIF values) with a common SCS, for which the UE is capable of monitoring and/or decoding. In this case, the quantity of BDs may be determined according to an equation:

$$M_{PDCCH}^{total,slot,\mu} = \left\lfloor \frac{N_{cells}^{cap} \cdot M_{PDCCH}^{max,slot,\mu} \cdot W_{cells}^{DL,\mu}}{\Sigma_{j=0}^{3} W_{cells}^{DL,j}} \right\rfloor$$

where $\mu$ represents a single SCS configuration (e.g., the quantity of BDs is on a per SCS configuration basis), $$M_{PDCCH}^{max,slot,\mu}$$

is a quantity of monitored PDCCH candidates per slot for a downlink bandwidth part with an SCS configuration $\mu$ (e.g., as described in more detail with regard to Table 10.1-2 of 3GPP TS 38.213), $$N_{cells}^{cap}$$

is a value of the pdcch-BlindDetectionCA parameter, and $$W_{cells}^{DL,\mu}$$

is a sum of CIF values of all scheduling cells with SCS configuration $\mu$ (e.g., with serving cells not configured with a CIF value being tabulated with a value of 1). In some aspects, a per-SCS BD limit is based at least in part on an equation $$M_{PDCCH}^{total,slot,\mu} = \left\lfloor \frac{N_{cells}^{cap} \cdot M_{PDCCH}^{max,slot,\mu} \cdot W_{cells}^{DL,\mu}}{\Sigma_{j=0}^{3} W_{cells}^{DL,j}} \right\rfloor,$$

where $N_{cells}$ represents a quantity of configured cells (e.g., $$N_{cells}^{DL,\mu}$$

is a quantity of configured downlink cells for scheduling cells with SCS configuration $\mu$ without a CIF configuration and a quantity of CIF values for scheduling cells with SCS configuration $\mu$ with a CIF configuration).

A network node and a UE may determine the quantity of BDs and select a BD budget that is less than or equal to the quantity of BDs to ensure that the UE capability is not exceeded. In other words, the UE and the network node may determine a maximum quantity of BDs per slot with an SCS configuration $\mu$ as $$\max(M_{PDCCH}^{max,slot,\mu}, M_{PDCCH}^{total,slot,\mu}).$$

Similarly, the UE may indicate and the UE and the network node may determine a CCE budget on a per SCS configuration basis using a similar equation to the aforementioned equation (e.g., where a CCE parameter is indicated rather than a BD parameter). For example, rather than the parameter $$M_{PDCCH}^{max,slot,\mu}$$

for the BD budget, the CCE budget may be based at least in part on a parameter $$C_{PDCCH}^{max,slot,\mu}$$

(e.g., as described in more detail with regard to Table 10.1-3 of 3GPP TS 38.213). As shown in FIG. 10, in one example (e.g., where pdcch-BlindDetectionCA=4), values for $$M_{PDCCH}^{total,slot,\mu}$$

may be determined for sets of scheduling CCs (e.g., scheduling cells), CIF values, scheduled CCs (e.g., scheduled cells) and values for $$M_{PDCCH}^{max,slot,\mu}.$$

In some aspects, the per-SCS BD limit according to the UE-reported pdcch-BlindDetectCAparameter may apply when a plurality of cells are derived to a CIF value.

As indicated above, FIG. 10 is provided as an example. Other examples may differ from what is described with respect to FIG. 10.

Figure 11:
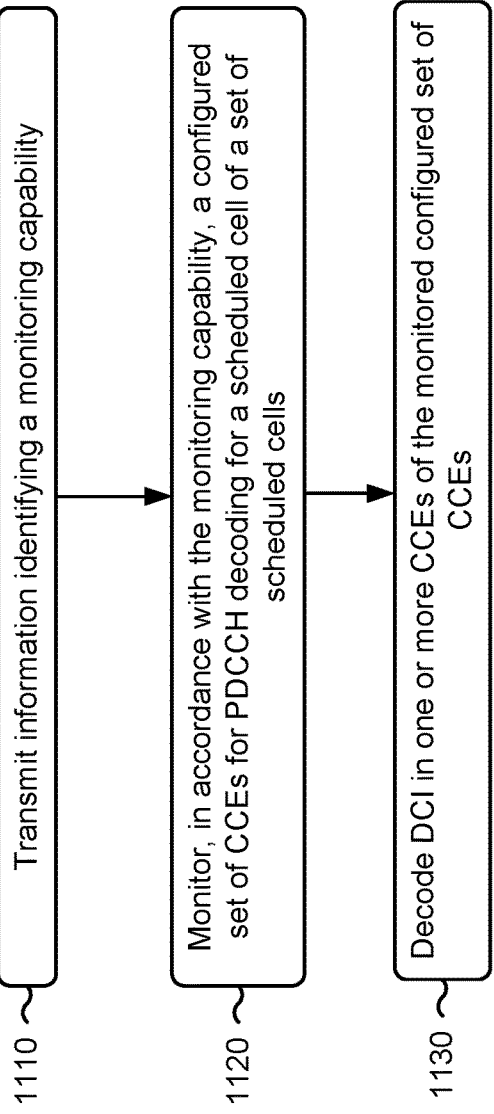
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with downlink control channel monitoring.

As shown in FIG. 11, in some aspects, process 1100 may include transmitting information identifying a monitoring capability (block 1110). For example, the UE (e.g., using communication manager 140 and/or transmission component 1204, depicted in FIG. 12) may transmit information identifying a monitoring capability, as described above. In some aspects, the UE may receive an indication to monitor PDCCH candidates for a DCI format.

As further shown in FIG. 11, in some aspects, process 1100 may include monitoring, in accordance with the monitoring capability, a configured set of CCEs for PDCCH decoding for a scheduled cell of a set of scheduled cells (block 1120). For example, the UE (e.g., using communication manager 140 and/or monitoring component 1208, depicted in FIG. 12) may monitor, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis, as described above. In some aspects, the UE may monitor, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis.

As further shown in FIG. 11, in some aspects, process 1100 may include decoding DCI in one or more CCEs of the monitored configured set of CCEs (block 1130). For example, the UE (e.g., using communication manager 140 and/or decoding component 1210, depicted in FIG. 12) may decode DCI in one or more CCEs of the monitored configured set of CCEs, as described above.

Process 1100 may include additional aspects, such as any single aspect or any combination of aspects described below and/or in connection with one or more other processes described elsewhere herein.

In a first aspect, the monitoring capability is a PDCCH monitoring capability that indicates the PDCCH blind decode budget or the CCE budget on the per SCS configuration basis for a scheduling cell.

In a second aspect, alone or in combination with the first aspect, a maximum quantity of monitored PDCCH candidates for PDCCH decoding is based at least in part on at least one of the PDCCH blind decode budget, per slot for a downlink bandwidth part, the CCE budget, per slot for the downlink bandwidth part, or an SCS configuration for a scheduling cell.

In a third aspect, alone or in combination with one or more of the first and second aspects, process 1100 includes transmitting information identifying a value for a blind detection parameter, wherein the CCE budget or the PDCCH blind decode budget is on the per SCS configuration basis based at least in part on the transmission of the information identifying the value for the blind detection parameter.

In a fourth aspect, alone or in combination with one or more of the first through third aspects, the PDCCH blind decode budget, per slot, is based at least in part on a quantity of carrier indicator field values of a set of scheduling cells with a common subcarrier spacing configuration.

In a fifth aspect, alone or in combination with one or more of the first through fourth aspects, the CCE budget, per slot, is based at least in part on carrier indicator field values of a set of scheduling cells with a common subcarrier spacing.

In a sixth aspect, alone or in combination with one or more of the first through fifth aspects, the DCI is associated with a configured DCI size budget, wherein the configured DCI size budget is on the per carrier indicator field value basis.

In a seventh aspect, alone or in combination with one or more of the first through sixth aspects, the scheduled cell is associated with a single carrier indicator field value.

In an eighth aspect, alone or in combination with one or more of the first through seventh aspects, the scheduled cell is associated with a plurality of carrier indicator field values.

In a ninth aspect, alone or in combination with one or more of the first through eighth aspects, at least one search space set associated with the DCI is based at least in part on a value of a carrier indicator field.

In a tenth aspect, alone or in combination with one or more of the first through ninth aspects, process 1100 includes receiving signaling conveying an information element, wherein the information element includes information associated with a format of the DCI.

In an eleventh aspect, alone or in combination with one or more of the first through tenth aspects, process 1100 includes receiving signaling conveying an information element, wherein the information element includes information associated with a cross-carrier scheduling configuration.

In an twelfth aspect, alone or in combination with one or more of the first through eleventh aspects, process 1100 includes forgoing monitoring of one or more search space sets based at least in part on a configuration of the UE.

In a thirteenth aspect, alone or in combination with one or more of the first through twelfth aspects, process 1100 includes transmitting a capability indication identifying a set of component carriers for monitoring, and wherein monitoring the configured set of CCEs comprises monitoring for the DCI based at least in part on a communication configuration in accordance with the capability indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
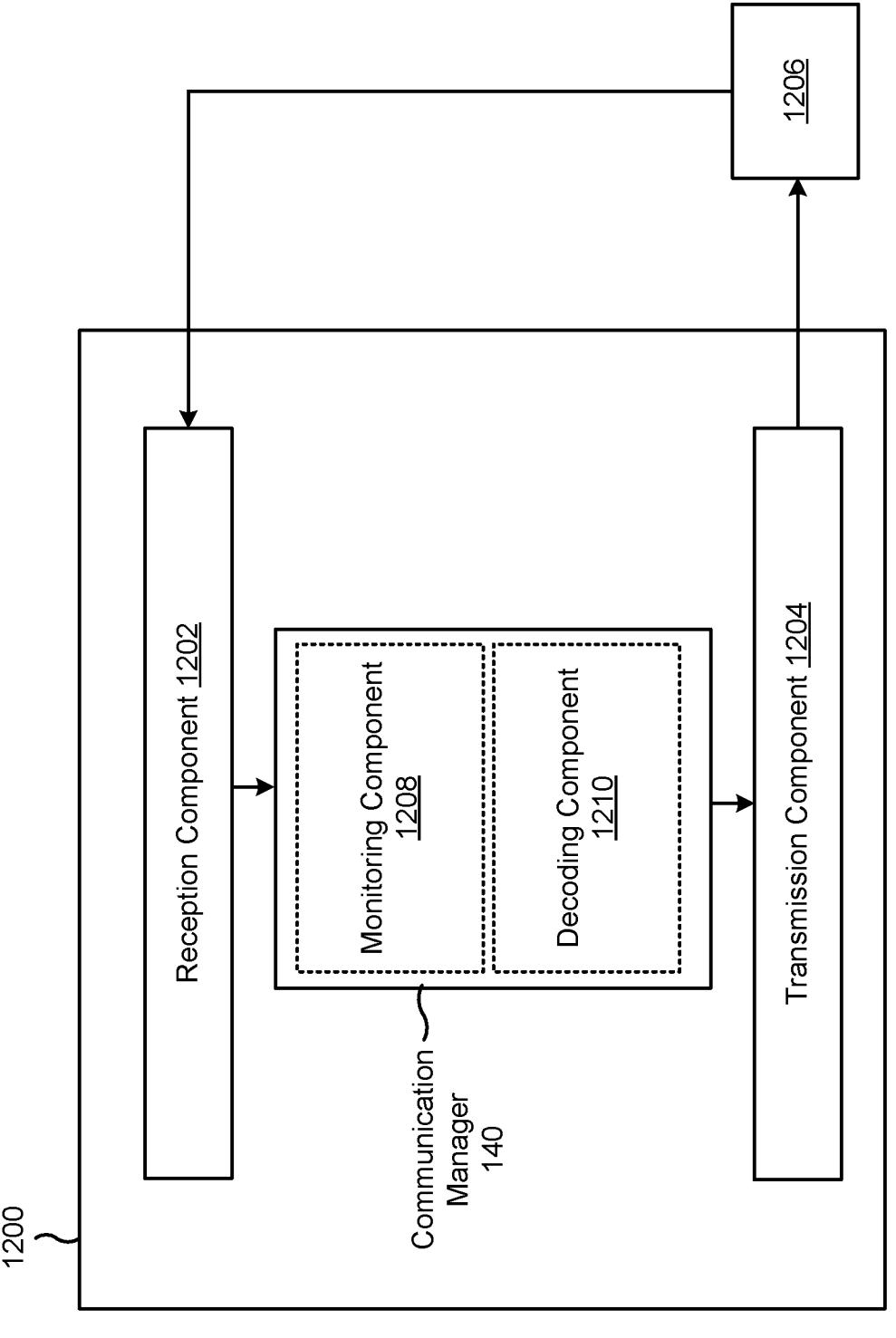
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a monitoring component 1208 or a decoding component 1210, among other examples.

In some aspects, the apparatus 1200 may be configured to perform one or more operations described herein in connection with FIGS. 6A-10. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The monitoring component 1208 may monitor a configured set of CCEs for PDCCH decoding for a scheduled cell of a set of scheduled cells, wherein the configured set of CCEs is on a per scheduled cell basis. The decoding component 1210 may decode DCI in one or more CCEs of the monitored configured set of CCEs. The reception component 1202 may receive signaling conveying an information element, wherein the information element includes information associated with a search space set with a format of the DCI. The reception component 1202 may receive signaling conveying an information element, wherein the information element includes information associated with a format of the DCI or a list of search space set IDs, and wherein the UE monitors the DCI with a cross-carrier scheduling configuration a cross-carrier scheduling configuration.

The monitoring component 1208 may monitor a configured set of CCEs for PDCCH decoding for a scheduled cell of a set of scheduled cells, wherein the configured set of CCEs is on a per carrier indicator field value basis. The decoding component 1210 may decode DCI in one or more CCEs of the monitored configured set of CCEs. The reception component 1202 may receive signaling conveying an information element, wherein the information element includes information associated with a format of the DCI. The reception component 1202 may receive signaling conveying an information element, wherein the information element includes information associated with a cross-carrier scheduling configuration. The transmission component 1204 may transmit a capability indication identifying a set of component carriers for monitoring.

The transmission component 1204 may transmit information identifying a monitoring capability. The monitoring component 1208 may monitor, in accordance with the monitoring capability, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis. The decoding component 1210 may decode DCI in one or more CCEs of the monitored configured set of CCEs.

The transmission component 1204 may transmit information identifying a value for a blind detection parameter, wherein the CCE budget or the PDCCH blind decode budget is on the per SCS configuration basis based at least in part on the transmission of the information identifying the value for the blind detection parameter. The reception component 1202 may receive signaling conveying an information element, wherein the information element includes information associated with a format of the DCI. The reception component 1202 may receive signaling conveying an information element, wherein the information element includes information associated with a cross-carrier scheduling configuration. The transmission component 1204 may transmit a capability indication identifying a set of component carriers for monitoring.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: monitoring a configured set of control channel elements (CCEs) for physical downlink control channel (PDCCH) decoding for a scheduled cell of a set of scheduled cells, wherein the configured set of CCEs is on a per scheduled cell basis, wherein a scheduled cell, of the set of scheduled cells, is associated with a configured set of carrier indicator field values for a carrier indicator field, wherein the monitoring is based at least in part on at least one of a CCE budget, a PDCCH blind decode budget, or a downlink control information (DCI) size budget; and decoding DCI in one or more CCEs of the monitored configured set of CCEs.

Aspect 2: The method of Aspect 1, wherein the DCI is associated with a configured DCI size budget, wherein the configured DCI size budget is on the per scheduled cell basis.

Aspect 3: The method of any of Aspects 1 to 2, wherein the scheduled cell is associated with a single carrier indicator field value.

Aspect 4: The method of any of Aspects 1 to 3, wherein the scheduled cell is associated with a plurality of carrier indicator field values.

Aspect 5: The method of any of Aspects 1 to 4, wherein at least one search space set associated with the DCI is based at least in part on a value of the carrier indicator field.

Aspect 6: The method of any of Aspects 1 to 5, further comprising: receiving signaling conveying an information element, wherein the information element includes information associated with a search space set with a format of the DCI.

Aspect 7: The method of any of Aspects 1 to 6, further comprising: receiving signaling conveying an information element, wherein the information element includes information associated with a format of the DCI or a list of search space set IDs, and wherein the UE monitors the DCI with a cross-carrier scheduling configuration a cross-carrier scheduling configuration.

Aspect 8: The method of any of Aspects 1 to 7, wherein the UE is configured to forgo monitoring of one or more search space sets based at least in part on a configuration of the UE.

Aspect 9: A method of wireless communication performed by a user equipment (UE), comprising: monitoring a configured set of control channel elements (CCEs) for physical downlink control channel (PDCCH) decoding for a scheduled cell of a set of scheduled cells, wherein a scheduled cell, of the set of scheduled cells, is associated with a configured set of carrier indicator field values, wherein the configured set of CCEs is on a per carrier indicator field value basis, wherein the monitoring is based at least in part on at least one of a CCE budget, a PDCCH blind decode budget, or a downlink control information (DCI) size budget; and decoding DCI in one or more CCEs of the monitored configured set of CCEs.

Aspect 10: The method of Aspect 9, wherein the DCI is associated with a configured DCI size budget, wherein the configured DCI size budget is on the per carrier indicator field value basis.

Aspect 11: The method of any of Aspects 9 to 10, wherein the scheduled cell is associated with a single carrier indicator field value.

Aspect 12: The method of any of Aspects 9 to 11, wherein the scheduled cell is associated with a plurality of carrier indicator field values.

Aspect 13: The method of any of Aspects 9 to 12, wherein at least one search space set associated with the DCI is based at least in part on a value of the carrier indicator field.

Aspect 14: The method of any of Aspects 9 to 13, further comprising: receiving signaling conveying an information element, wherein the information element includes information associated with a format of the DCI.

Aspect 15: The method of any of Aspects 9 to 14, further comprising: receiving signaling conveying an information element, wherein the information element includes information associated with a cross-carrier scheduling configuration.

Aspect 16: The method of any of Aspects 9 to 15, wherein the UE is configured to forgo monitoring of one or more search space sets based at least in part on a configuration of the UE.

Aspect 17: The method of any of Aspects 9 to 16, further comprising: transmitting a capability indication identifying a set of component carriers for monitoring; and wherein monitoring the configured set of CCEs comprises: monitoring for the DCI based at least in part on a communication configuration in accordance with the capability indication.

Aspect 18: A method of wireless communication performed by a user equipment (UE), comprising: transmitting information identifying a monitoring capability; monitoring, in accordance with the monitoring capability, a configured set of control channel elements (CCEs) for physical downlink control channel (PDCCH) decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis; and decoding DCI in one or more CCEs of the monitored configured set of CCEs.

Aspect 19: The method of Aspect 18, wherein the monitoring capability is a PDCCH monitoring capability that indicates the PDCCH blind decode budget or the CCE budget on the per SCS configuration basis for a scheduling cell.

Aspect 20: The method of any of Aspects 18 to 19, wherein a maximum quantity of monitored PDCCH candidates for PDCCH decoding is based at least in part on at least one of: the PDCCH blind decode budget, per slot for a downlink bandwidth part, the CCE budget, per slot for the downlink bandwidth part, or an SCS configuration for a scheduling cell.

Aspect 21: The method of any of Aspects 18 to 20, comprising: transmitting information identifying a value for a blind detection parameter, wherein the CCE budget or the PDCCH blind decode budget is on the per SCS configuration basis based at least in part on the transmission of the information identifying the value for the blind detection parameter.

Aspect 22: The method of any of Aspects 18 to 21, wherein the PDCCH blind decode budget, per slot, is based at least in part on a quantity of carrier indicator field values of a set of scheduling cells with a common subcarrier spacing configuration.

Aspect 23: The method of any of Aspects 18 to 22, wherein the CCE budget, per slot, is based at least in part on carrier indicator field values of a set of scheduling cells with a common subcarrier spacing.

Aspect 24: The method of any of Aspects 18 to 23, wherein the DCI is associated with a configured DCI size budget, wherein the configured DCI size budget is on the per carrier indicator field value basis.

Aspect 25: The method of any of Aspects 18 to 24, wherein the scheduled cell is associated with a single carrier indicator field value.

Aspect 26: The method of any of Aspects 18 to 25, wherein the scheduled cell is associated with a plurality of carrier indicator field values.

Aspect 27: The method of any of Aspects 18 to 26, wherein at least one search space set associated with the DCI is based at least in part on a value of a carrier indicator field.

Aspect 28: The method of any of Aspects 18 to 27, further comprising: receiving signaling conveying an information element, wherein the information element includes information associated with a format of the DCI.

Aspect 29: The method of any of Aspects 18 to 28, further comprising: receiving signaling conveying an information element, wherein the information element includes information associated with a cross-carrier scheduling configuration.

Aspect 30: The method of any of Aspects 18 to 29, comprising forgoing monitoring of one or more search space sets based at least in part on a configuration of the UE.

Aspect 31: The method of any of Aspects 18 to 30, further comprising: transmitting a capability indication identifying a set of component carriers for monitoring; and wherein monitoring the configured set of CCEs comprises: monitoring for the DCI based at least in part on a communication configuration in accordance with the capability indication.

Aspect 32: A method of wireless communication performed by a UE, comprising: receiving an indication to monitor PDCCH candidates for a DCI format; monitoring, in accordance with the indication, a configured set of CCEs for PDCCH decoding for a scheduled cell of a set of scheduled cells, a scheduled cell, of the set of scheduled cells, being associated with a configured set of carrier indicator field values, the configured set of CCEs being on a per carrier indicator field value basis, the monitoring being based at least in part on at least one of a CCE budget, a PDCCH blind decode budget, or a DCI size budget, the CCE budget or the PDCCH blind decode budget being on a per SCS configuration basis; and decoding DCI in one or more CCEs of the monitored configured set of CCEs.

Aspect 33: An apparatus for wireless communication at a device, comprising a processor; memory coupled with the processor; and instructions stored in the memory and executable by the processor to cause the apparatus to perform the methods of one or more of Aspects 1-32.

Aspect 34: A device for wireless communication, comprising a memory and one or more processors coupled to the memory, the one or more processors configured to perform the methods of one or more of Aspects 1-32.

Aspect 35: An apparatus for wireless communication, comprising at least one means for performing the methods of one or more of Aspects 1-32.

Aspect 36: A non-transitory computer-readable medium storing code for wireless communication, the code comprising instructions executable by a processor to perform the methods of one or more of Aspects 1-32.

Aspect 37: A non-transitory computer-readable medium storing a set of instructions for wireless communication, the set of instructions comprising one or more instructions that, when executed by one or more processors of a device, cause the device to perform the methods of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
   receive an indication to monitor physical downlink control channel (PDCCH) candidates for a downlink control information (DCI) format;
   monitor, in accordance with the indication, a configured set of control channel elements (CCEs) for PDCCH decoding for a scheduled cell of a set of scheduled cells, the scheduled cell being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis, wherein the CCE budget or the PDCCH blind decode budget is on the per SCS configuration basis based at least in part on information identifying a value for a blind detection parameter; and
   decode DCI in one or more CCEs of the monitored configured set of CCEs.

2. The UE of claim 1, wherein the monitoring is associated with a PDCCH monitoring capability that indicates the PDCCH blind decode budget or the CCE budget on the per SCS configuration basis for a scheduling cell.

3. The UE of claim 1, wherein a maximum quantity of monitored PDCCH candidates for PDCCH decoding is based at least in part on at least one of:
   the PDCCH blind decode budget, per slot for a downlink bandwidth part,
   the CCE budget, per slot for the downlink bandwidth part, or
   an SCS configuration for a scheduling cell.

4. The UE of claim 1, wherein the PDCCH blind decode budget, per slot, is based at least in part on a quantity of carrier indicator field values of a set of scheduling cells with a common subcarrier spacing configuration.

5. The UE of claim 1, wherein the CCE budget, per slot, is based at least in part on carrier indicator field values of a set of scheduling cells with a common subcarrier spacing.

6. The UE of claim 1, wherein the DCI is associated with a configured DCI size budget, wherein the configured DCI size budget is on the per carrier indicator field value basis.

7. The UE of claim 1, wherein the scheduled cell is associated with a single carrier indicator field value.

8. The UE of claim 1, wherein the scheduled cell is associated with a plurality of carrier indicator field values.

9. The UE of claim 1, wherein at least one search space set associated with the DCI is based at least in part on a value of a carrier indicator field.

10. The UE of claim 1, wherein the one or more processors are further configured to:
   receive signaling conveying an information element, wherein the information element includes information associated with a format of the DCI.

11. The UE of claim 1, wherein the one or more processors are further configured to:
   receive signaling conveying an information element, wherein the information element includes information associated with a cross-carrier scheduling configuration.

12. The UE of claim 1, wherein the UE is configured to forgo monitoring of one or more search space sets based at least in part on a configuration of the UE.

13. The UE of claim 1, wherein the one or more processors are further configured to:
   transmit a capability indication identifying a set of component carriers for monitoring; and
   wherein the one or more processors, to monitor the configured set of CCEs, are configured to:
   monitor for the DCI based at least in part on a communication configuration in accordance with the capability indication.

14. A method of wireless communication performed by a user equipment (UE), comprising:

receiving an indication to monitor physical downlink control channel (PDCCH) candidates for a downlink control information (DCI) format;

monitoring, in accordance with the indication, a configured set of control channel elements (CCEs) for PDCCH decoding for a scheduled cell of a set of scheduled cells, the scheduled cell being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis, wherein the CCE budget or the PDCCH blind decode budget is on the per SCS configuration basis based at least in part on information identifying a value for a blind detection parameter; and decoding DCI in one or more CCEs of the monitored configured set of CCEs.

15. The method of claim 14, wherein the monitoring is associated with a PDCCH monitoring capability that indicates the PDCCH blind decode budget or the CCE budget on the per SCS configuration basis for a scheduling cell.

16. The method of claim 14, wherein a maximum quantity of monitored PDCCH candidates for PDCCH decoding is based at least in part on at least one of:

the PDCCH blind decode budget, per slot for a downlink bandwidth part, the CCE budget, per slot for the downlink bandwidth part, or an SCS configuration for a scheduling cell.

17. The method of claim 14, wherein the PDCCH blind decode budget, per slot, is based at least in part on a quantity of carrier indicator field values of a set of scheduling cells with a common subcarrier spacing configuration.

18. The method of claim 14, wherein the CCE budget, per slot, is based at least in part on carrier indicator field values of a set of scheduling cells with a common subcarrier spacing.

19. The method of claim 14, wherein the DCI is associated with a configured DCI size budget, wherein the configured DCI size budget is on the per carrier indicator field value basis.

20. The method of claim 14, wherein the scheduled cell is associated with a single carrier indicator field value.

21. The method of claim 14, wherein the scheduled cell is associated with a plurality of carrier indicator field values.

22. The method of claim 14, wherein at least one search space set associated with the DCI is based at least in part on a value of a carrier indicator field.

23. The method of claim 14, further comprising:

receiving signaling conveying an information element, wherein the information element includes information associated with a format of the DCI.

24. The method of claim 14, further comprising:

receiving signaling conveying an information element, wherein the information element includes information associated with a cross-carrier scheduling configuration.

25. The method of claim 14, comprising forgoing monitoring of one or more search space sets based at least in part on a configuration of the UE.

26. The method of claim 14, further comprising:

transmitting a capability indication identifying a set of component carriers for monitoring; and wherein monitoring the configured set of CCEs comprises:

monitoring for the DCI based at least in part on a communication configuration in accordance with the capability indication.

27. A non-transitory computer-readable medium storing a set of instructions for wireless communication, the set of instructions comprising:

one or more instructions that, when executed by one or more processors of a user equipment (UE), cause the UE to:

receive an indication to monitor physical downlink control channel (PDCCH) candidates for a downlink control information (DCI) format;

monitor, in accordance with the indication, a configured set of control channel elements (CCEs) for PDCCH decoding for a scheduled cell of a set of scheduled cells, the scheduled cell being associated with a configured set of carrier indicator field values, the configured set of CCEs being on a per carrier indicator field value basis, the monitoring being based at least in part on at least one of a CCE budget, a PDCCH blind decode budget, or a downlink control information (DCI) size budget, the CCE budget or the PDCCH blind decode budget being on a per subcarrier spacing (SCS) configuration basis, wherein the CCE budget or the PDCCH blind decode budget is on the per SCS configuration basis based at least in part on information identifying a value for a blind detection parameter; and decode DCI in one or more CCEs of the monitored configured set of CCEs.

28. The non-transitory computer-readable medium of claim 27, wherein the DCI is associated with a configured DCI size budget, and the configured DCI size budget is on the per carrier indicator field value basis.

29. The non-transitory computer-readable medium of claim 27, wherein the instructions further cause the UE to receive signaling conveying an information element, wherein the information element includes information associated with a format of the DCI.

30. The non-transitory computer-readable medium of claim 27, wherein the instructions further cause the UE to transmit:

a capability indication identifying a set of component carriers for monitoring; and information identifying the value for the blind detection parameter.

*    *    *    *    *